(12) United States Patent
Lloyd et al.

(10) Patent No.: US 7,056,608 B2
(45) Date of Patent: Jun. 6, 2006

(54) CURRENT COLLECTOR FOR USE IN A FUEL CELL

(75) Inventors: Greg A. Lloyd, Spokane, WA (US); Lijun Bai, Spokane, WA (US); Shibli Hanna I. Bayyuk, Spokane, WA (US)

(73) Assignee: Relion, Inc., Spokane, WA (US)

( * ) Notice: Subject to any disclaimer, the term of this patent is extended or adjusted under 35 U.S.C. 154(b) by 506 days.

(21) Appl. No.: 10/367,985

(22) Filed: Feb. 14, 2003

(65) Prior Publication Data

US 2004/0161659 A1   Aug. 19, 2004

(51) Int. Cl.
*H01M 8/00*   (2006.01)
(52) U.S. Cl. ........................................ 429/12
(58) Field of Classification Search .................. 429/12, 429/32, 44
See application file for complete search history.

(56) References Cited

U.S. PATENT DOCUMENTS

| | | | |
|---|---|---|---|
| 4,847,172 A | 7/1989 | Maskalick et al. ............. | 429/30 |
| 4,997,728 A | 3/1991 | Onoda et al. .................. | 429/34 |
| 5,035,962 A | 7/1991 | Jensen .......................... | 429/40 |
| 5,037,525 A | 8/1991 | Badwal ....................... | 204/421 |
| 5,059,497 A | 10/1991 | Prince et al. ............... | 429/193 |
| 5,143,801 A | 9/1992 | Bates ........................... | 429/33 |
| 5,286,568 A | 2/1994 | Bacino et al. ............... | 428/422 |
| 5,346,780 A | 9/1994 | Suzuki ......................... | 429/42 |
| 5,618,392 A | 4/1997 | Furuya ........................ | 204/252 |
| 5,635,039 A | 6/1997 | Cisar et al. ................. | 204/252 |
| 5,733,682 A | 3/1998 | Quadakkers et al. ........ | 429/210 |
| 5,736,269 A | 4/1998 | Okamoto et al. ............. | 429/32 |
| 5,786,105 A | 7/1998 | Matsushima et al. ......... | 429/34 |
| 5,795,671 A | 8/1998 | Nirasawa et al. ............. | 429/41 |
| 5,945,231 A | 8/1999 | Narayanan et al. ........... | 429/30 |
| 5,998,057 A | 12/1999 | Koschany et al. ............ | 429/42 |
| 6,010,798 A | 1/2000 | Hammerschmidt et al. ... | 429/30 |
| 6,022,634 A | 2/2000 | Ramunni et al. ............. | 429/34 |
| 6,030,718 A | 2/2000 | Fuglevand et al. ........... | 429/26 |
| 6,037,075 A | 3/2000 | Critz et al. ................... | 429/36 |
| 6,042,955 A | 3/2000 | Okamoto ...................... | 429/13 |
| 6,051,343 A | 4/2000 | Suzuki et al. ............... | 429/316 |
| 6,051,778 A | 4/2000 | Ichinose et al. ............ | 136/256 |
| 6,054,228 A | 4/2000 | Cisar et al. ................... | 429/18 |
| 6,054,230 A | 4/2000 | Kato ........................... | 429/33 |
| 6,066,409 A | 5/2000 | Ronne et al. ................. | 429/39 |
| 6,080,290 A | 6/2000 | Stuart et al. ................ | 204/269 |

(Continued)

FOREIGN PATENT DOCUMENTS

WO    WO 01/82399    11/2001

OTHER PUBLICATIONS

Woo-kum Lee et al., "The Effects of Compression and Gas Diffusion Layers on the Performance of a PEM Fuel Cell," *Journal of Power Sources*, 1999 Elsevier Science, pp. 45-51.

(Continued)

*Primary Examiner*—Patrick Joseph Ryan
*Assistant Examiner*—Thomas H. Parsons
(74) *Attorney, Agent, or Firm*—Wells St. John P.S.

(57) ABSTRACT

A current collector for use in a fuel cell is described and wherein the fuel cell includes an ion exchange membrane having opposite anode and cathode sides, and a current collector is disposed in ohmic electrical contact with each of the anode and cathode sides, and wherein at least one of the current collectors has a surface area which provides substantially effective operational hydration for the ion exchange membrane.

27 Claims, 14 Drawing Sheets

U.S. PATENT DOCUMENTS

| | | | |
|---|---|---|---|
| 6,146,780 A | 11/2000 | Cisar et al. | 429/34 |
| 6,153,330 A | 11/2000 | Kenyon et al. | 429/165 |
| 6,183,898 B1 | 2/2001 | Koschany et al. | 429/42 |
| 6,194,099 B1 | 2/2001 | Gernov et al. | 429/213 |
| 6,200,698 B1 | 3/2001 | Carlstrom, Jr. | 429/34 |
| 6,207,310 B1 | 3/2001 | Wilson et al. | 429/26 |
| 6,218,035 B1 | 4/2001 | Fuglevand et al. | 429/30 |
| 6,218,039 B1 | 4/2001 | Mease et al. | 429/37 |
| 6,228,518 B1 | 5/2001 | Kindler | 429/13 |
| 6,232,008 B1 | 5/2001 | Woznickzka et al. | 429/39 |
| 6,255,012 B1 | 7/2001 | Wilson et al. | 429/38 |
| 6,268,076 B1 | 7/2001 | Diekmann et al. | 429/30 |
| 6,280,868 B1 | 8/2001 | Badwal et al. | 429/34 |
| 6,280,870 B1 | 8/2001 | Eisman et al. | 429/34 |
| 6,287,717 B1 | 9/2001 | Cavalca et al. | 429/40 |
| 6,291,094 B1 | 9/2001 | Yoshimura et al. | 429/34 |
| 6,322,914 B1 | 11/2001 | Chow et al. | 429/13 |
| 6,365,293 B1 | 4/2002 | Isono et al. | 429/30 |
| 6,468,682 B1 | 10/2002 | Fuglevand et al. | 429/26 |
| 6,531,238 B1 | 3/2003 | King | 429/38 |
| 6,566,004 B1 | 5/2003 | Fly et al. | 429/39 |
| 6,716,549 B1 * | 4/2004 | Bai et al. | 429/34 |
| 2002/0081475 A1 | 6/2002 | Simpkins et al. | 429/30 |

OTHER PUBLICATIONS

Jari Ihonen et al., "A Novel Polymer Electrolyte Fuel Cell for Laboratory Investigations and In-situ contact Resistance Measurments," *Electrochimica Acta*, 2001 Elsevier Science, pp. 2899-2911.

B.D. Cullity, "Elements of X-Ray Diffraction," Addison-Wesley Publishing Co., Inc., © 1978.

* cited by examiner

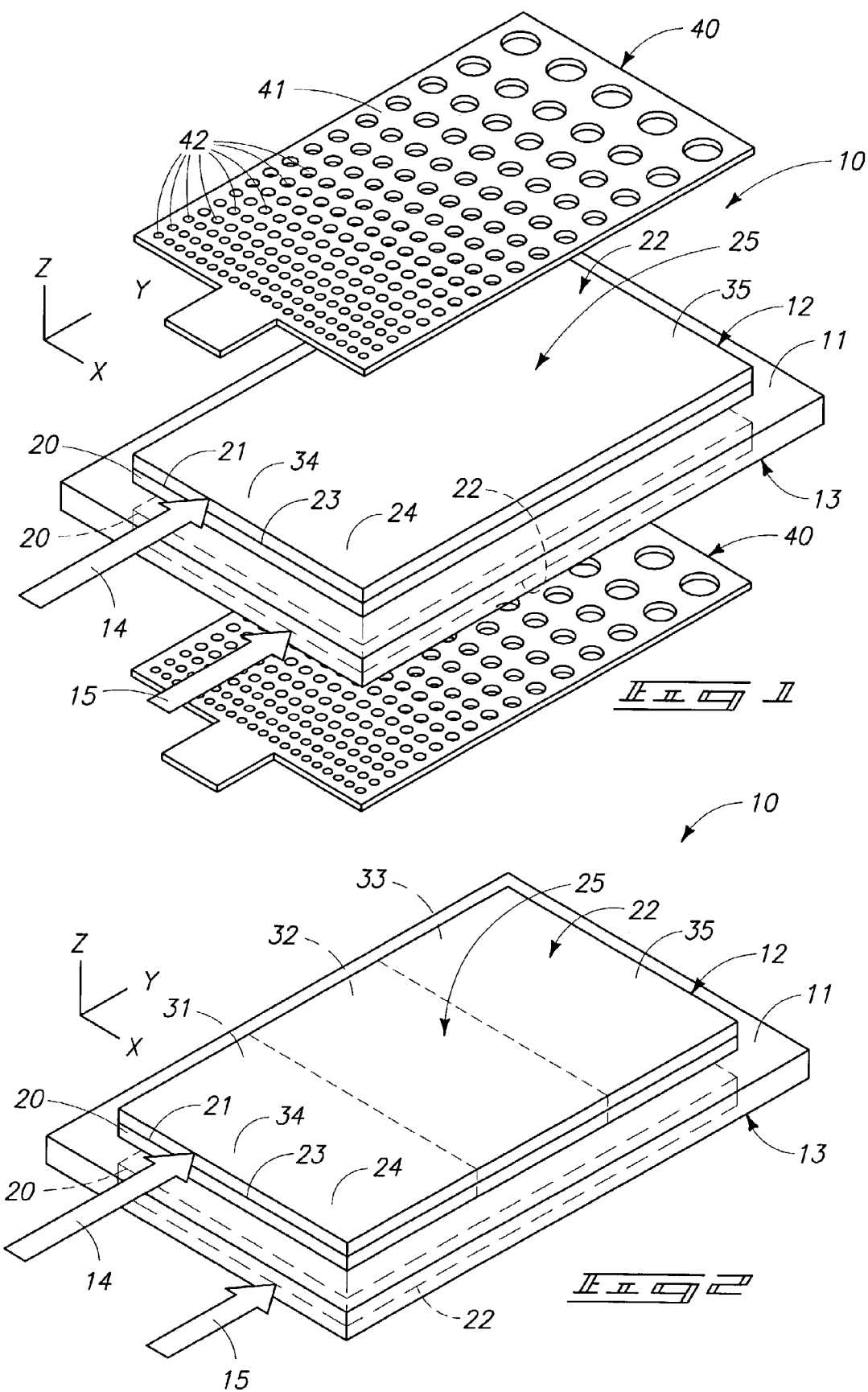

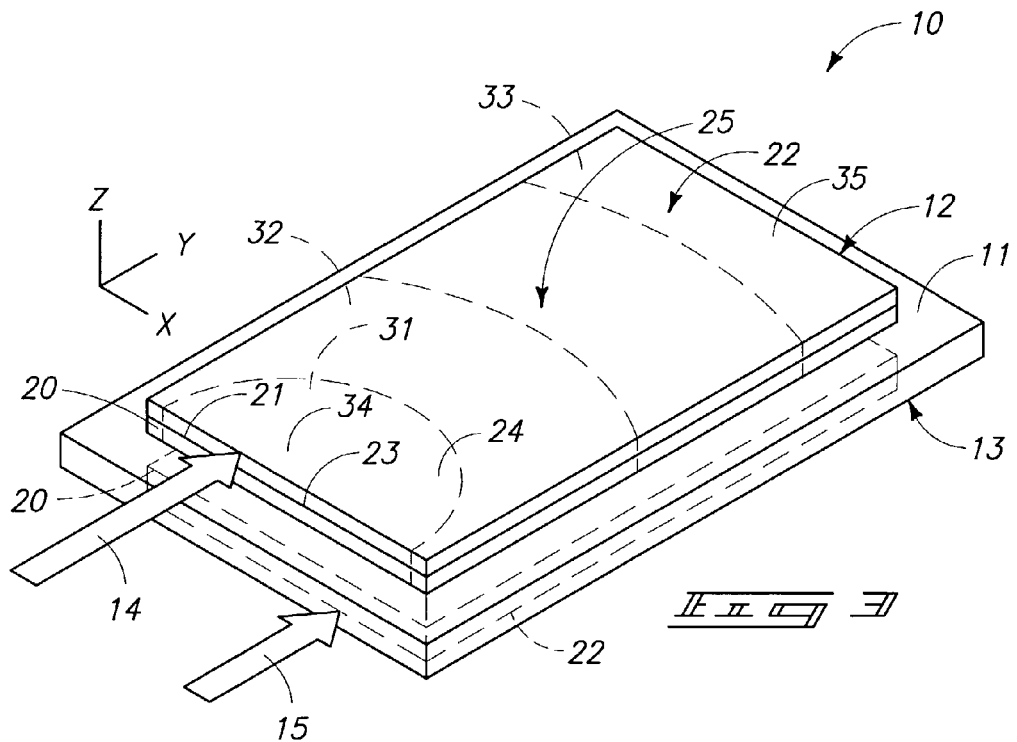
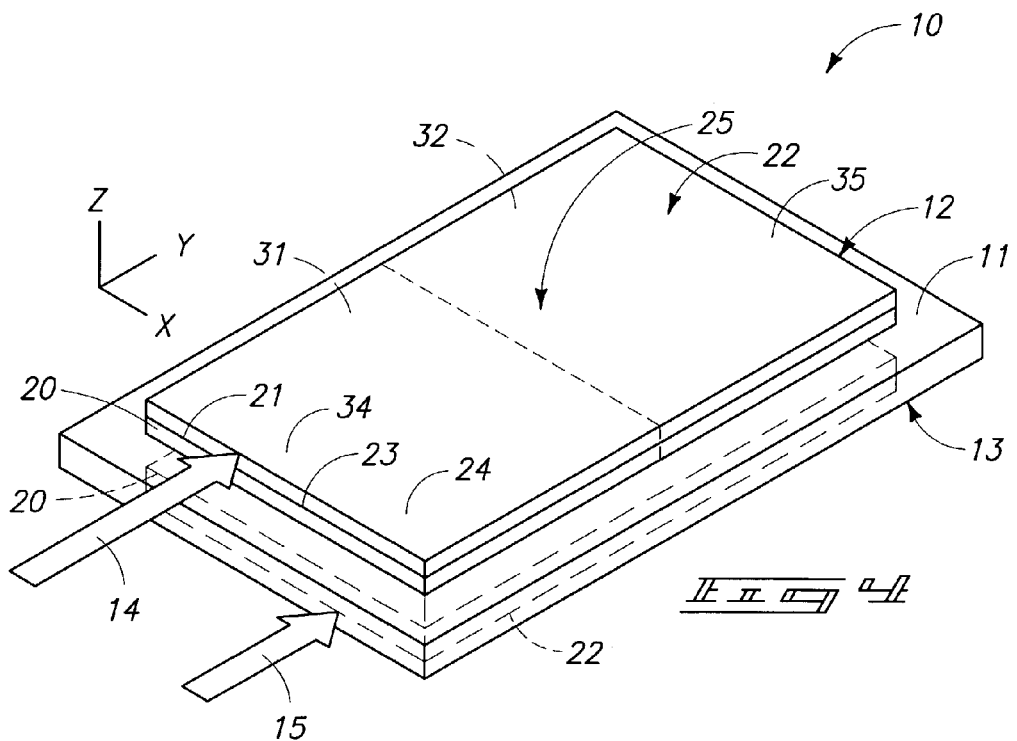

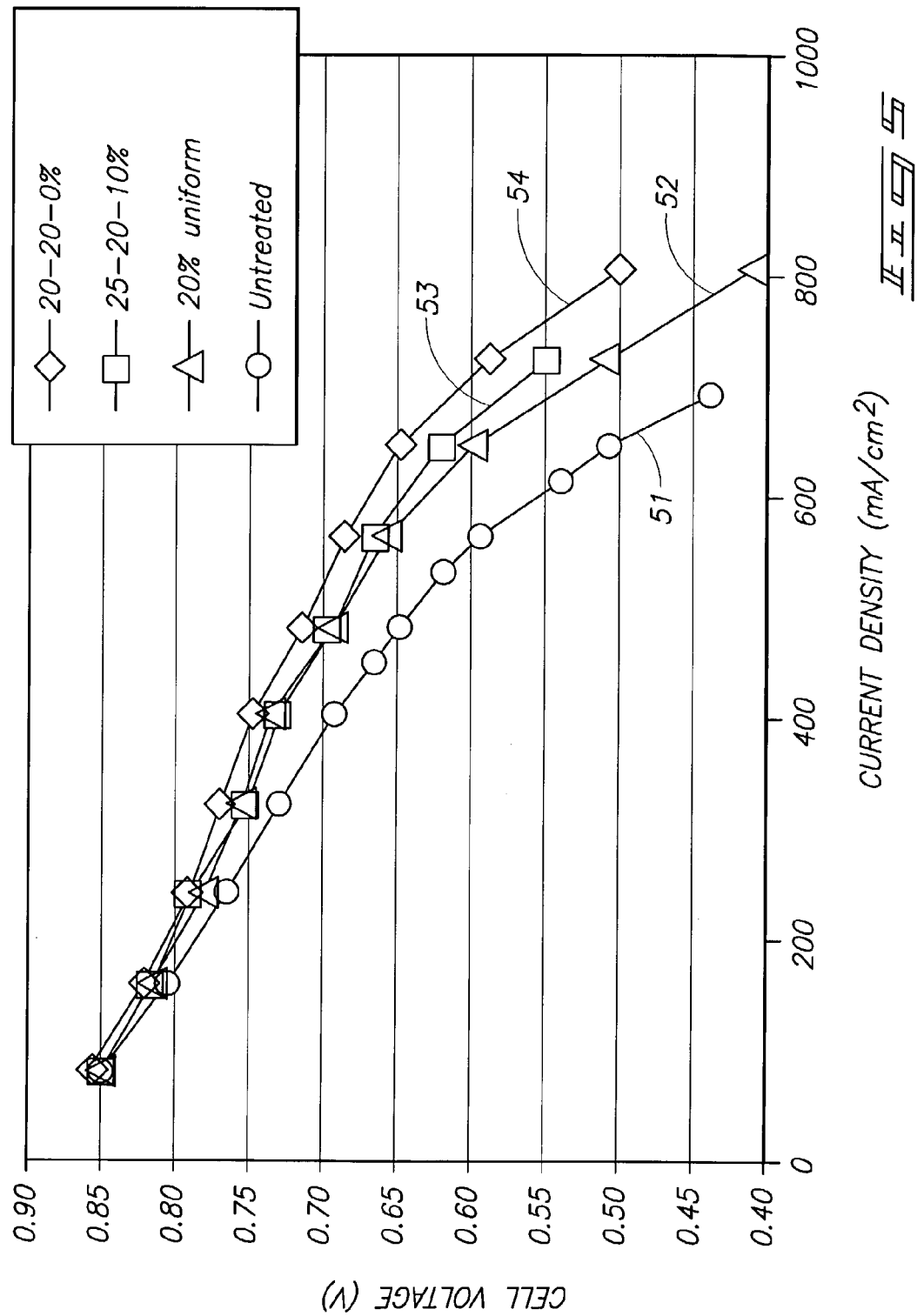

CURRENT COLLECTOR FOR USE IN A FUEL CELL

TECHNICAL FIELD

The present invention relates to a current collector for use in a fuel cell and more specifically to a current collector which provides effective operational hydration for an ion exchange membrane.

BACKGROUND OF THE INVENTION

A fuel cell is a device which can readily convert chemical energy into electrical and heat energy by the reaction of a fuel gas with a suitable oxidant supply. In a proton exchange membrane fuel cell, for example, the fuel gas is typically hydrogen, and the oxidant supply is oxygen (or more typically ambient air). In fuel cells of this type, a membrane electrode diffusion layer assembly is provided, and which includes a solid polymer electrolyte which has opposite anode and cathode sides. Appropriate electrodes are provided on the opposite anode and cathode sides. During operation, fuel gas reacts in the presence of a catalyst which is incorporated into the electrode on the anode side to produce hydrogen ions which migrate through the solid polymer electrolyte to the opposite cathode side. Meanwhile, an oxidant supply introduced to the cathode in the presence of the catalyst reacts with the hydrogen ions in the presence of the catalyst which is incorporated into the electrode on that side to produce water and a resulting electrical output. The electrical power output is withdrawn from the fuel cell by means of current collectors which are disposed in ohmic electrical contact against the anode and cathode sides of the ion exchange membrane.

Many fuel cell designs have been provided through the years and much research and development activity has been conducted to develop a fuel cell which meets the perceived performance and cost per watt requirements of various users. Despite decades of research, fuel cells have not been widely embraced except for narrow commercial applications. While many designs have emerged, and which have operated with various degrees of success, shortcomings in some peculiar aspect of their individual designs have resulted in difficulties which have detracted from their widespread commercial acceptance and perceived usefulness.

For example, one of the perceived challenges for fuel cell designers is the reduction of contact resistance between the current collector and an adjacent gas diffusion layer which is borne by the membrane electrode diffusion layer assembly. This contact resistance is, generally speaking, inversely related to the power output of the fuel cell. Consequently, lowering the contact resistance increases the overall electrical output of the fuel cell.

Still further, fuel designers have long recognized that as a fuel gas and oxidant is supplied or directed over an active area of an ion exchange membrane which is incorporated therein, several interrelated, and competing factors may come into play, and which may vary the performance of the fuel cell. These several factors that are involved in the performance of the fuel cell and the ion exchange membrane include the relative hydration of the ion exchange membrane; the concentration of the fuel and/or oxidant; and the relative temperature of the reactants and the ion exchange membrane itself. In this regard when fuel cells are designed, particular care is taken to substantially optimize the diffusion layers which are made integral with the ion exchange membrane relative to perceived operational conditions under which the fuel cell may operate.

As might be expected, as operational conditions change, these competing factors may begin to vary across the face of the active area of the membrane electrode diffusion layer assembly. As a result, the specific characteristics of the respective diffusion layers often becomes suboptimal. For example, a once optimal degree of porosity and/or permeability and hydrophobicity at a predetermined location on the ion exchange membrane may, in view of the location where the fuel gas is introduced, become suboptimal. This is also often the condition at the bleed or exhaust area of the membrane electrode diffusion layer assembly where excess fuel gas, water, and other by products are removed from the fuel cell.

In traditional fuel cell stack designs, for example, a great deal of attention has been paid to the design of fuel flow channels in order to substantially optimize the current output across the entire active area. However, notwithstanding the attempts of the prior art, even in air-cooled, planar, fuel cell stack designs, the hydration of the membrane electrode diffusion layer assembly, and ultimately its performance, varies as the fuel, gas, and air travel across the surface of the fuel cell active area.

A fuel cell having a current collector, and other structures which address these and other perceived shortcomings in the prior art practices is the subject matter of the present application.

SUMMARY OF THE INVENTION

A first aspect of the present invention relates to a fuel cell which includes an ion exchange membrane having opposite anode and cathode sides; and a current collector disposed in ohmic electrical contact with each of the anode and cathode sides, and wherein at least one of the current collectors has a surface area which induces substantially effective operational hydration for the ion exchange membrane.

Another aspect of the present invention relates to a fuel cell which includes an ion exchange membrane having opposite anode and cathode sides, and which, during operation, produces water which hydrates the ion exchange membrane, and heat energy; and a current collector disposed in ohmic electrical contact with each of the anode and cathode sides, and wherein at least one of the current collectors has a surface area which defines a plurality of open areas which are distributed in a pattern that facilitates heat dissipation and the substantially uniform hydration of the ion exchange membrane.

Yet another aspect of the present invention relates to a fuel cell which includes an ion exchange membrane having opposite anode and cathode sides; an electrode disposed in ion exchanging relation relative to the ion exchange membrane; a gas diffusion layer having a surface area which is defined by X, Y, and Z axes, and which is borne by at least one of the electrodes, and wherein the gas diffusion layer has a variable hydrophobicity when measured in the X and/or Y axes; and a current collector positioned in ohmic electrical contact with each of the anode and cathode sides, and wherein at least one of the current collectors has a plurality of openings which are distributed in a pattern, and wherein the variably hydrophobic gas diffusion layer, and the current collector, in combination, provides for substantially uniform hydration of the ion exchange membrane fuel cell during operation.

Still another aspect of the present invention relates to a fuel cell which includes an ion exchange membrane having opposite anode and cathode sides, and which further has first and second locations; an electrode positioned on each of the anode and cathode sides; a gas diffusion layer borne by at least one of the electrodes, and which has a variable hydrophobicity when measured in a direction between the first and second locations; a porous metal coating disposed on the gas diffusion layer and which has a variable porosity; a source of a fuel gas supplied to the first location on the anode side of the ion exchange membrane, and wherein the fuel cell produces water during operation, and wherein excessive fuel gas and water is removed from the ion exchange membrane at the second location, and wherein the water produced during operation is utilized to hydrate the ion exchange membrane; a current collector disposed in ohmic electrical contact with each of the anode and cathode sides, and wherein at least one of the current collectors has a plurality of openings disposed in an arrangement which varies when measured in a direction between the first and second locations; and an airflow provided to the cathode side of the ion exchange membrane, and wherein the fuel cell produces heat energy during operation, and wherein the variably hydrophobic gas diffusion layer, porous metal coating, cathode current collector, and the airflow provide substantially uniform hydration of the ion exchange membrane during fuel cell operation.

BRIEF DESCRIPTION OF THE DRAWINGS

Preferred embodiments of the invention are described below with reference to the following accompanying drawings.

FIG. 1 is a somewhat simplified, exaggerated and exploded depiction of a pair of current collectors and a membrane electrode diffusion layer assembly which employs the teachings of the present invention.

FIG. 2 is a somewhat simplified, and exaggerated depiction of a membrane electrode diffusion layer assembly which illustrates a second form of the present invention.

FIG. 3 is a somewhat simplified, and exaggerated depiction of a membrane electrode diffusion layer assembly which illustrates still another form of the present invention.

FIG. 4 is a somewhat simplified, and exaggerated depiction of a membrane electrode diffusion layer assembly which illustrates yet another form of the present invention.

FIG. 6 is a graphic depiction of fuel cell voltage versus current for a fuel cell membrane electrode diffusion layer assembly and which employs the teachings of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 11:
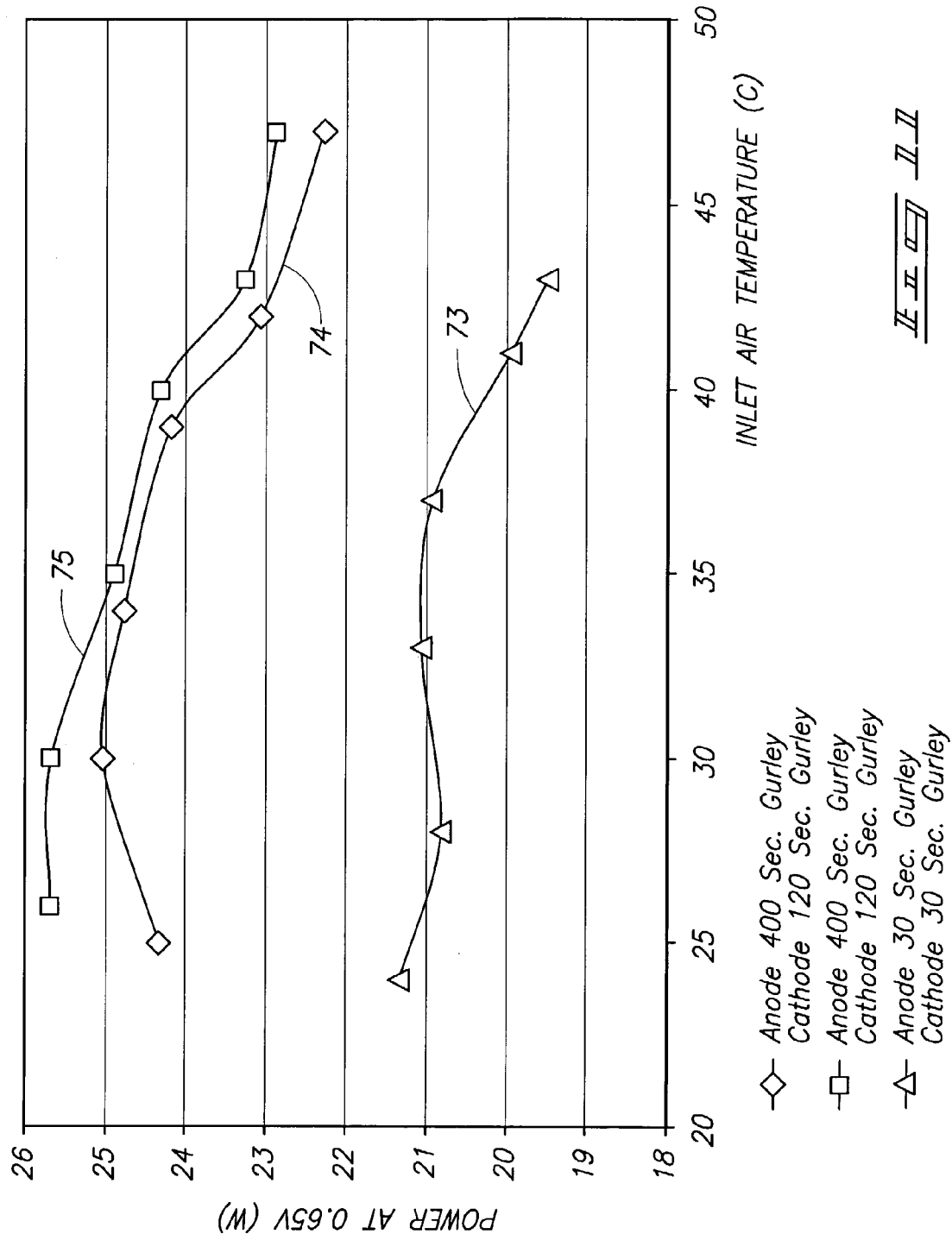
FIG. 11 is a graphic depiction of the performance of several fuel cell examples, and which demonstrate some aspects of the present invention.

FIG. 1 is a greatly enlarged, perspective, exploded view of a membrane electrode diffusion layer assembly 10 and associated current collectors which employs the teachings of the present invention. The membrane electrode diffusion layer assembly (MEDLA) is received within, or made integral with, an ion exchange membrane fuel cell module such as what is depicted in FIGS. 11 and/or 12, the features of which will be discussed in greater detail hereinafter. The current collectors employed with the MEDLA will also be discussed in later paragraphs. For purposes of the present discussion, however, the MEDLA 10, as will be disclosed below, is useful in fuel cells which operate at temperatures of less than about 300° C. Consequently, this invention is not useful in solid oxide fuel cell designs, and other fuel cells which generally operate at temperatures greater than about 300° C. As will be appreciated by a study of FIGS. 1–4, for example, various aspects of the construction of the MEDLA 10 can be expressed in terms of dimensions as measured substantially along the X, Y and Z axes. In this regard the X and Y axes related to the length and width dimension of an object, and the Z axis relates to the thickness of the same object. As seen in FIG. 1, and following, a fuel cell employing the present invention will typically utilize an ion exchange polymer membrane 11, such as may be purchased under the trade name "Nafion". The ion exchange membrane 11 is a thin, flexible, and sheet-like material which is made either solely from a sulfonated fluoropolymer or from a supported fluoropolymer. This ion exchange membrane fabricated from "Nafion" is available from the Dupont™ company. The ion exchange membrane 11 has opposite anode and cathode sides 12 and 13 respectively. As seen in FIGS. 1–4, the anode side 12 of the MEDLA 10 can be provided with a fuel supply which is generally indicated by the numeral 14. Still further, the opposite cathode side 13 is provided with an oxidant or air supply which is generally indicated by the numeral 15. As will be discussed in greater detail with respect to specific forms of ion exchange membrane fuel cells which employ the present invention, the air supply 15 which is provided to the MEDLA 10 also provides a convenient means for regulating the overall operational temperature of the fuel cell. For example, in one form of the invention (FIG. 11), a preponderance of the heat energy generated during fuel cell operation is removed by way of the air supply 15 which is provided to the cathode side 13 of the ion exchange membrane 11. In another form of the invention (FIG. 12), less than a preponderance of the heat energy is removed by way of the air supply provided to the cathode side of the ion exchange membrane.

As will be seen from a study of FIGS. 1–4, an electrode layer 20 is disposed in ion exchanging relation relative to the respective anode and cathode sides 12 and 13, respectively. The electrode layer 20 is of conventional design, and which, during fuel cell operation, facilitates the generation and movement of ions across the ion exchange membrane 11. Each electrode layer 20 has an outwardly facing surface 21. As seen in FIG. 1 a gas diffusion layer 22 is borne by, or otherwise juxtaposed relative to the outwardly facing surface 21 of the electrode layer 20. The gas diffusion layer has an inside facing surface 23, and an outside facing surface 24. In one form of the invention, the gas diffusion layer 22 is applied as a carbon based slurry which may be modified, as needed, to provide different levels or degrees of hydrophobicity and porosity for the anode and cathode sides 13 and 14, respectively.

As used in this application, the word porous means the volume of interstices of a material relative to the volume of the mass of the material. Porosity effects the state of permeability of a material, that is the property of a porous material that is the measure of the amount (rate or volume) at which a fluid (liquid or gas) passes through a unit of cross-section of material at a given viscosity, under a unit of gradient pressure. Therefore, at fixed gradient pressure, and viscosity, the permeability of a given material is directly related to its porosity. For purposes of this application, therefore, the terms porosity and permeability may be used interchangeably with the understanding that an increase in porosity (interstical volume) will normally result in an increase in permeability, and vice versa.

In the present invention, the gas diffusion layer 22 may be modified, as provided below, to achieve improved performance characteristics by providing effective and substantially uniform hydration of the ion exchange membrane 11. While the gas diffusion layer 22, as shown in FIGS. 1–4, is illustrated as a single layer, this same gas diffusion layer, as will be discussed below, may include individually discrete layers each having a different porosity (permeability) and hydrophobicity.

As best illustrated in FIGS. 1–4, it will be seen that the outwardly facing surface 24 of each gas diffusion layer 22 defines a major surface 25. In the present invention, at least one of the gas diffusion layers 22 located on the anode or cathode side 12 and 13 has a hydrophobicity which varies when measured in a direction which is substantially along the major surface 25 and which facilitates substantially optimal hydration of the ion exchange membrane 11 at fuel cell operating temperatures. For example, as seen in FIG. 1, the gas diffusion layer 22 which is juxtaposed relative to the anode side 12 and cathode side 13 of the ion exchange membrane 11 may both have a variable hydrophobicity. In the alternative, it is possible that only one of the anode or cathode sides has a variable hydrophobic gas diffusion layer 22. Still further in another form of the invention, the gas diffusion layer 22 may have a hydrophobicity which varies when measured in the X axis; Y axis; X and Y axes; and X, Y and Z axes. As should be understood by a study of FIGS. 1–4, the oxidant 15 and fuel supplies 14 each have a direction of flow as indicated by the arrows relative to the major surface 25. As will appreciated, the hydrophobicity of the respective gas diffusion layers may vary when measured in substantially the same general direction of flow of the fuel supply 14; and/or oxidant supply 15.

As seen in FIG. 2, and in an alternative form of the invention, the ion exchange membrane 11 includes a gas diffusion layer 22 having discrete first, second and third zones 31, 32 and 33 respectively. The respective discrete zones may each have individually unique yet substantially constant hydrophobicity. However, in one form of the invention, the relative hydrophobicity of the respective zones may be variable or a mixture of substantially constant and variable hydrophobicity zones. Still referring to FIG. 2, in still another form of the invention, where the gas diffusion layer 22 has a plurality of discrete zones 31, 32 and 33, one of the discrete zones may have a continuously variable hydrophobicity; and the hydrophobicity of the remaining zones are variable and different in degree of their respective hydrophobic natures from the continuously variable one. Yet further, in another form of the invention the discrete zones 31–33 may have substantially similar surface areas, and the hydrophobicity of the respective discrete zones is variable. As seen in FIG. 3, and in another form of the invention, the gas diffusion layer 22 as provided on the anode side 12 of the ion exchange membrane 11 has a plurality of discrete zones 31, 32 and 33 respectively, and wherein at least one of the discrete zones has a surface area which is dissimilar from the remaining discrete zones. In this arrangement, the hydrophobicity of the discrete zones 31, 32 and 33 may be varied in assorted combinations. In each of the forms of the invention as seen in FIGS. 1–4, the gas diffusion layer 22 includes a plurality of discrete zones 31–33, each of which has a surface area, and wherein the hydrophobicity and surface area of the respective zones are varied to provide a substantially favorable hydration of the ion exchange membrane 11. In addition to providing optimal hydration, the hydrophobicity and surface area of the respective zones 31–33 may be varied to provide a substantially enhanced current density for the ion exchange membrane 11 as will be discussed, hereinafter. Moreover, in each of the forms of the invention, where a plurality of discrete zones 31, 32 and 33 are provided, it is possible for the hydrophobicity and the surface area of the respective zones to be varied to provide both a substantially favorable hydration and enhanced current density for the ion exchange membrane 11. Still further, in those forms of the invention as shown in FIGS. 1–4 that include a plurality of discrete zones, the gas diffusion layer 22 may be provided with a variable porosity (permeability). In this arrangement, the hydrophobicity, porosity (permeability) and surface area of the respective zones may be varied to provide both substantially optimal hydration and enhanced current density for the ion exchange membrane 11.

As discussed above, the ion exchange membrane 11 is provided with fuel and oxidant supplies 14 and 15, respectively, and which are each introduced to the ion exchange membrane at a first location 34 which is located along the major surface 25. Further, any remaining fuel, oxidant, or any byproducts are removed from the ion exchange membrane 11 at a second location or bleed 35 which is located along the major surface 25. The oxidant and fuel supplies 14 and 15 move in a linear or nonlinear path of travel between the first and second locations. In the arrangements as shown in FIGS. 1–4, the hydrophobicity may vary when measured in substantially the same direction of flow of the respective paths of travel. In another form of the invention, the hydrophobicity may vary when measured in substantially the same general direction of flow as the fuel supply 14. Still further in other forms of the invention the hydrophobicity of the gas diffusion layer 22 is greatest at a location adjacent the first location 34, and is least when measured at a location adjacent to the second location 35. In still other forms of the invention the hydrophobicity of the gas diffusion layer 22 may be least when measured at a location adjacent the first location 34 and may be the greatest when measured at a location adjacent to the second location 35. In each of the non-limiting and representative examples, noted above, the hydrophobicity is varied in order to provide substantially uniform and appropriate hydration for the ion exchange membrane 11 and increased current density, both of which provide for improved performance for a fuel cell which incorporates the MEDLA 10.

As will be discussed in greater detail with respect to FIG. 9, it should be understood that the gas diffusion layer 22 may comprise two portions which are juxtaposed or located closely adjacent to the outwardly facing surface 21 of the electrode 20. In this regard, the gas diffusion layer 22 may comprise a macro-diffusion layer which includes, in one form, a carbon fiber based sheet having a porosity, which is, as a general matter, greater than the porosity of an adjacent micro-diffusion layer which is made integral therewith. This macro-diffusion layer can be commercially purchased under the trade name "Toray" from various commercial sources. The micro-diffusion layer, which will be discussed in greater detail hereinafter, is made integral with a macro-diffusion layer. In combination these two layers define the gas diffusion layer 22. It should be understood that the gas diffusion layer 22, which is described herein, as including both a macro-diffusion layer, and a micro-diffusion layer, may in some forms of the invention include only one of these two previously described diffusion layers.

Figure 12:
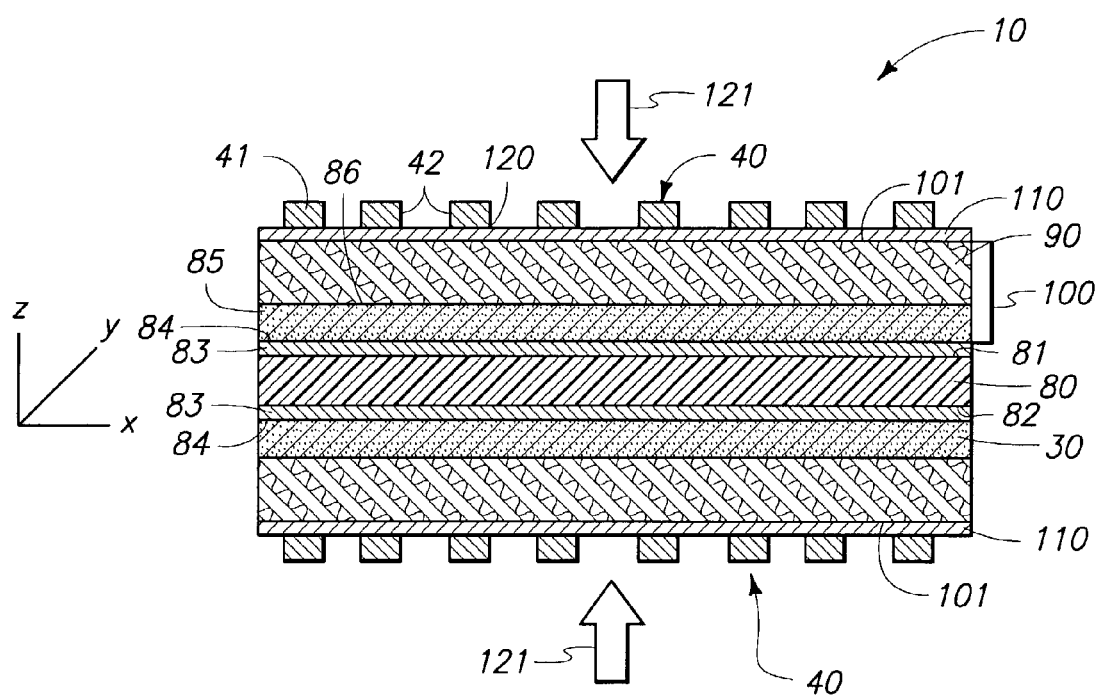
FIG. 12 is a fragmentary, transverse, vertical, sectional view of an ion exchange membrane fuel cell which utilizes the teachings of the present invention.

Referring to FIG. 1, it will be seen that a fuel cell, such as what is illustrated in FIGS. 11 and 12, and which employs a membrane electrode diffusion layer assembly 10 is utilized in combination with a current collector 40. The current collector 40 is disposed in ohmic electrical contact with each of the anode and cathode sides 12 and 13, respectively. The current collector 40 has a main body 41, and which is defined by a surface area. The current collector 40 as described herein provides for substantially effective operational hydration for the ion exchange membrane 11. In this regard, the surface area of the main body 41, defines a plurality of variously sized openings 42 which are distributed in a predetermined pattern. As should be understood, and as earlier discussed, during fuel cell operation, the membrane electrode diffusion layer assembly 10 may have regions which have a higher relative temperature than adjacent regions which have a lower relative temperature. To address this operational condition, the variously sized openings 42 may, in some forms of the invention, be smaller in size in those regions which have the higher relative temperature, than for example regions adjacent thereto which may have a lower relative temperature. Still further, and as earlier discussed, during operation of a fuel cell such as what is shown in FIGS. 11 and 12, a membrane electrode diffusion layer assembly 10 may have regions which have a lower amount of hydration in relative comparison to another region which has a greater amount of hydration. In this operational condition, the current collector 40 when placed in ohmic electrical contact against the membrane electrode diffusion layer assembly 10 has openings which are located in the region having a lower amount of hydration, and which are smaller in size in relative comparison to those openings 42, which are disposed in another region, and which has a greater amount of hydration. Referring still to FIG. 1, and with respect to the anode side 11 of the membrane electrode diffusion layer assembly 10, during operation, the membrane electrode diffusion layer assembly is supplied with a fuel supply or gas 14, and the cathode 12 is supplied with a source of oxidant 15. During operation the fuel gas is introduced at a first location 34 relative to the membrane electrode diffusion layer assembly 10, and any remaining fuel gas and by-products are removed at a second location 35. In this arrangement, when a current collector 40 is place in ohmic electrical contact against the anode side 11, the openings in the main body 41 of the current collector 40 have a first size when measured at the first location, and a second size when measured at the second location. As seen in FIG. 1, the first size is smaller than the second size.

As will be appreciated from a study of FIG. 1, the current collectors 40 and which are placed into ohmic electrical contact relative to the anode and cathode sides 11 and 12 of the membrane electrode diffusion layer assembly 10 defines a variable amount of open area. In particular, the surface area of the main body 41 defines predetermined open areas in the form of round apertures 42. These apertures 42 are variable in both sizes, location and open area percentage. As earlier discussed, a gas diffusion layer 22 having a gas permeability is borne by at least one of the anode or cathode sides 11 and 12. The gas permeability of the gas diffusion layer 22, in combination with the surface area or open area percentage of at least one of the current collectors 40 provides effective operational hydration for the ion exchange membrane 11. In this regard, the gas permeability of gas diffusion layer 22 is controlled, in part by a porous metal coating or layer which is borne by the gas diffusion layer 22, and which will be discussed in greater detail hereinafter. As will be recognized from a study of FIG. 1 and the discussion above, the open areas or apertures 42 are spaced at variable distances, one from the other, and have various dimensional relationships in order to facilitate the appropriate operational hydration of the underlying membrane electrode diffusion layer assembly 10. As should be understood, and during fuel cell operation, water, and heat energy are generated by the operation of the membrane electrode diffusion layer assembly 10. The current collector 40 which is disposed in ohmic electrical contact with each of the anode and cathode sides 11 and 12 has a surface area which is defined by the main body 41 and which defines a plurality of open areas 42 which are distributed in a pattern which facilitates both heat dissipation and the substantially uniform hydration of the ion exchange membrane 11.

Figure 5:
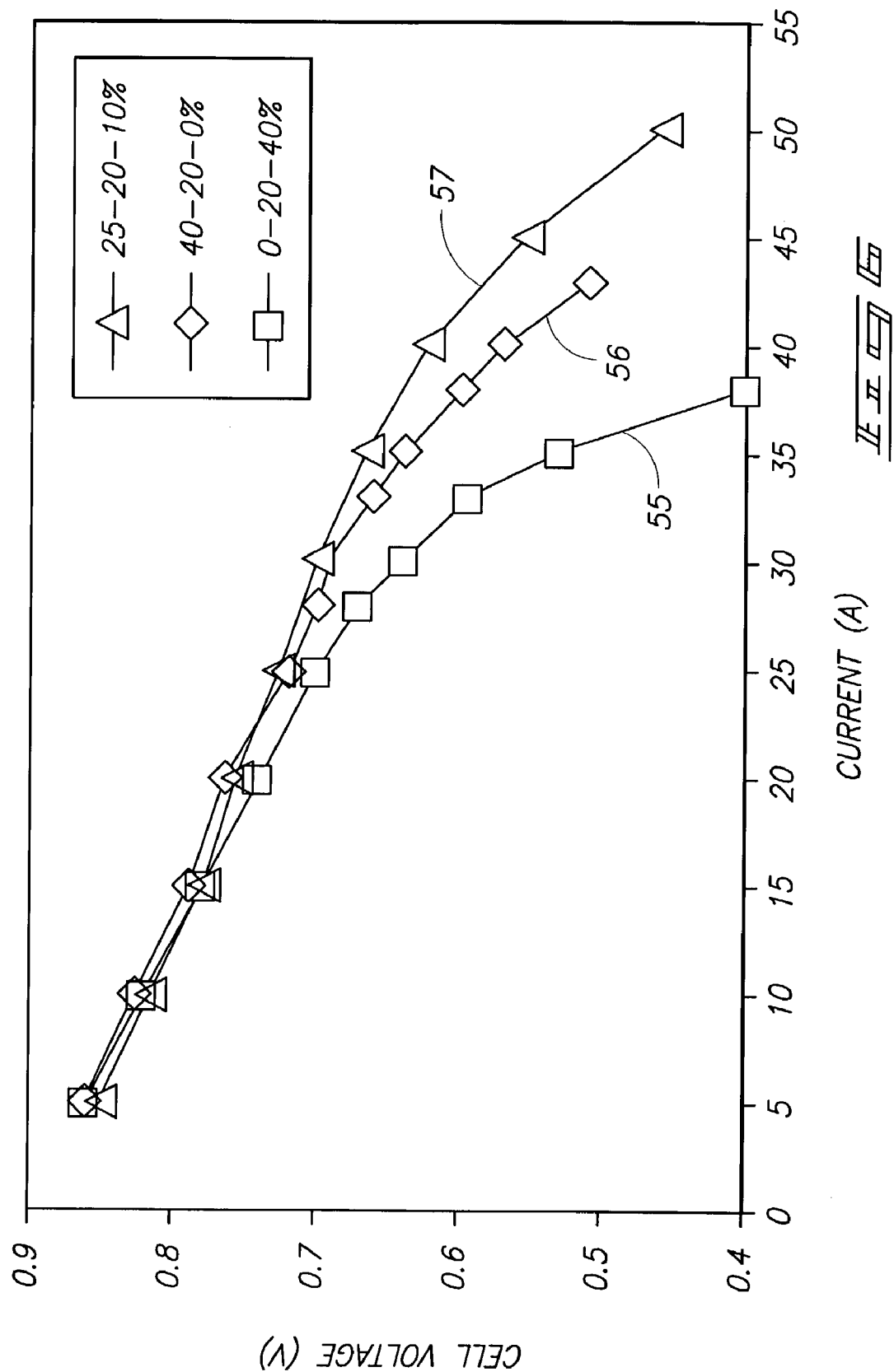
FIG. 5 is a graphic depiction of fuel cell voltage versus current density for a fuel cell having a membrane electrode diffusion layer assembly which utilizes the teachings of the present invention.

Referring now to FIG. 5, a graph is provided and which shows the relationship of current voltage versus current density as expressed in milliamps per square centimeter of surface area for four different MEDLA's 10 and which demonstrate some characteristics of the present invention. As will be seen in FIG. 5, the line label 51 graphically depicts an ion exchange membrane fuel cells performance employing a MEDLA 10 which has a gas diffusion layer 22 which has not been treated in any fashion to provide an enhanced or variable hydrophobicity. The line labeled 52 in FIG. 5 depicts the performance of an ion exchange membrane fuel cell utilizing a MEDLA 10 which is provided with a gas diffusion layer 22 which is fabricated in a fashion so as to have a micro-diffusion layer which has a substantially uniform TEFLON™ (PTFE) content of about 20% and a particulate carbon content of about 80%. The PTFE renders the micro-diffusion layer hydrophobic. A comparison of lines 51 and 52 will reveal that providing a gas diffusion layer with an enhanced hydrophobicity markedly increases the performance characteristics of a fuel cell incorporating same. Still referring to FIG. 5, line 53 graphically illustrates the performance of an ion exchange membrane fuel cell incorporating a MEDLA 10, and wherein gas diffusion layer 22 includes first, second and third zones 31, 32 and 33, respectively. In this regard, the first zone 31 has a PTFE content of about 25%; the second zone has a PTFE content of about 20%; and the third zone has a PTFE content of about 10%. It will be seen by a comparison of line 53 with lines 51 and 52, that further enhanced performance characteristics, and higher current densities can be realized by providing a plurality of zones each having a different hydrophobicity. Referring now to line 54 in FIG. 5, the performance of a MEDLA 10 for use in an ion exchange membrane fuel cell is shown and which has a plurality of zones as earlier discussed. In this regard the first zone 31 has a PTFE content of about 20%; the second zone 32 has a PTFE content of about 20%; and the third zone 33 has substantially no PTFE content. As will be seen, further enhanced current densities and fuel cell voltages are realized in this gas diffusion layer 22 arrangement as compared with lines 51, 52, and 53 respectively.

Referring now to FIG. 6 a second graph is provided and which further demonstrates other characteristics of the present invention. As seen in FIG. 6, line 55 depicts the performance of an ion exchange membrane fuel cell having a MEDLA 10 with a gas diffusion layer 22 and which has a plurality of zones 31, 32 and 33 respectively. The MEDLA 10 as depicted by line 55 has a first zone 31 which has substantially no PTFE content. The second zone 32 has a PTFE content of about 20%; and the third zone 33 has a PTFE content of about 40%. Referring now to line 56 in FIG. 6, the performance of an ion exchange membrane fuel cell is shown and wherein a MEDLA 10 incorporating the present invention includes a plurality of zones 30 having a variable hydrophobicity. As seen with respect to the line label 56, the first zone 31 has a PTFE content of about 40%; the second zone 32 has a PTFE content of about 20%; and the third zone has substantially no PTFE content. When compared with line 55, it is clear that line 56 depicts a fuel cell having substantially enhanced performance characteristics relative to current and voltage densities. Further, and referring to line 57 it will be seen that an ion exchange membrane fuel cell incorporating a MEDLA 10 having a plurality of zones 30 which includes a first zone 31 having a PTFE content of about 25%; a second zone 32 having a PTFE content of about 20%; and a third zone having a PTFE content of about 10% shows further enhanced performance characteristics relative to lines 55, and 56.

Figure 7:
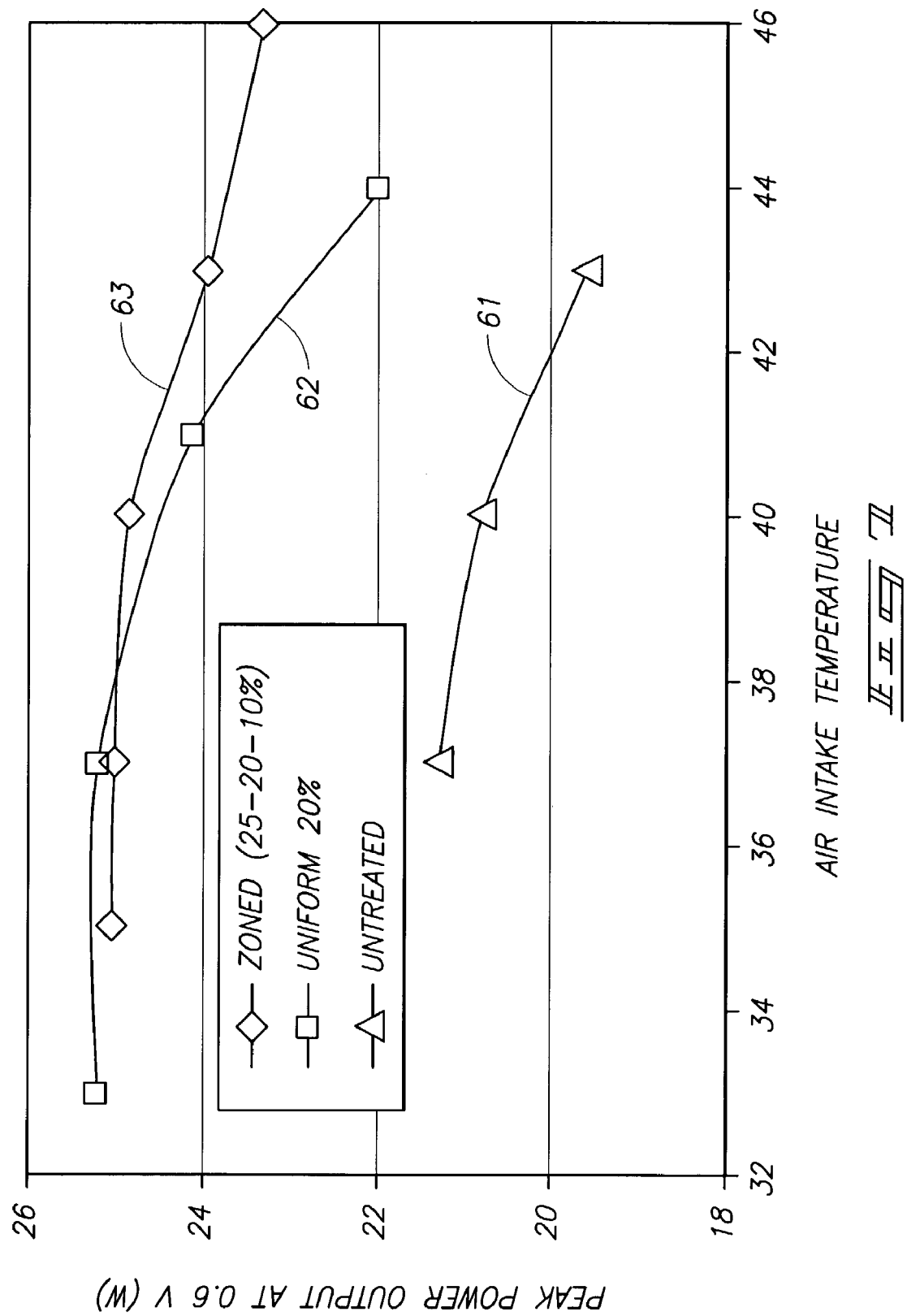
FIG. 7 is a graphic depiction of peak electrical power output at 0.6 volts versus air intake temperature in a fuel cell which employs a membrane electrode diffusion layer assembly and which utilizes the teachings of the present invention.

Referring now to FIG. 7 a graph is provided and which shows the peak power output for a fuel cell at an operating voltage of 0.6 volts (in watts), versus an air intake temperature for the same ion exchange membrane fuel cell. In this regard, line 61 depicts the performance characteristics of an ion exchange membrane fuel cell which employs a membrane electrode diffusion layer assembly 10 which has a gas diffusion layer 22 which has not been treated in any fashion to enhance its hydrophobic nature. Line 62 as depicted in FIG. 7 shows an ion exchange membrane fuel cell having a MEDLA 10 which has substantially uniform PTFE content of about 20%. A comparison of line 61 and 62 will show that the ion exchange membrane fuel cell employing a MEDLA 10 and having a substantially uniform hydrophobic nature provides enhanced performance characteristics for the ion exchange membrane fuel cell. Still further, and referring to line 63 in FIG. 7, the performance characteristics of an ion exchange membrane fuel cell is shown and which employs a MEDLA 10, which has a plurality of zones 30. In this regard the first zone 31 has a PTFE content of about 25%; the second zone 32 has a PTFE content of about 20%; and the third zone 33 has a PTFE content of about 10%. This clearly demonstrates that a MEDLA 10 having a gas diffusion layer 22 with a variable hydrophobicity provides enhanced performance characteristics for an ion exchange membrane fuel cell 11.

Figure 8:
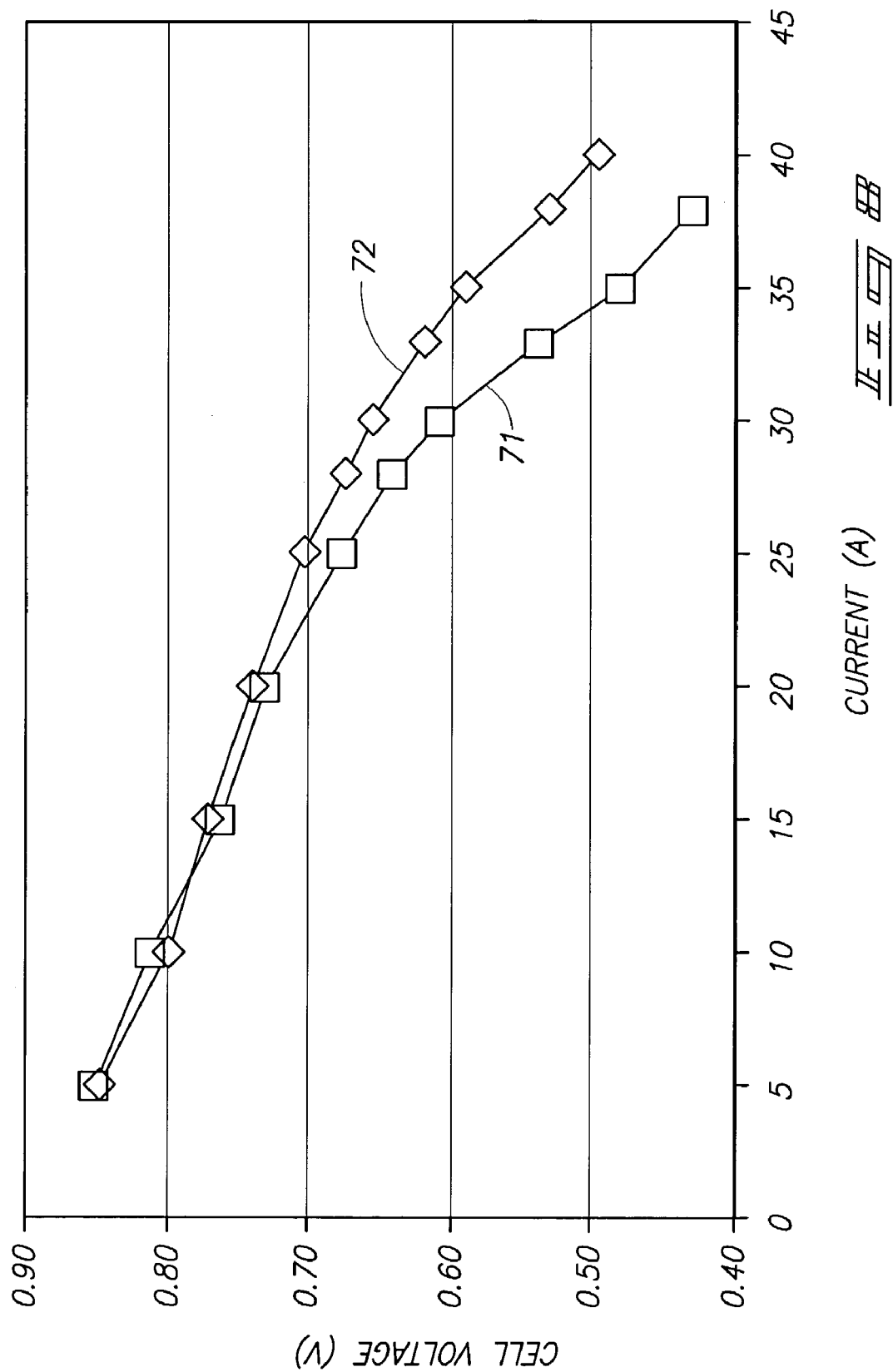
FIG. 8 is a graphic depiction of fuel cell voltage versus current in a fuel cell which employs a membrane electrode diffusion layer assembly and which utilizes the teachings of the present invention.

Referring now to FIG. 8, a graph is provided of a fuel cell voltage (in volts) versus current (in amps) as it relates to several ion exchange membrane fuel cells having different MEDLA 10 constructions. Line 71 depicts an ion exchange membrane fuel cell having a MEDLA 10 which includes a gas diffusion layer 22 and which is substantially untreated with respect to enhancing its hydrophobic nature. In contrast, line 72 depicts the performance characteristics of an ion exchange membrane fuel cell having a MEDLA 10 and which has a gas diffusion layer 22 located on the cathode side 13 of the ion exchange membrane 11, and which has a plurality of zones 30. In this regard, the cathode side 13 has a first zone 31 having a PTFE content of about 25%; a second zone 32 having a PTFE content of about 20%; and a third zone 33 having a PTFE content of about 15%. Still further, the anode side 12 is provided with a gas diffusion layer 22 which has a pair of zones 31 and 32 respectively. The first zone 31 on the anode side 12 has a PTFE content of about 5%; and the second zone 32 on the anode side is substantially untreated. As will be seen by comparing line 71 and 72, the fuel cell incorporating the MEDLA 10 having the construction as illustrated by line 72 has significantly enhanced performance characteristics relative to a fuel cell having a gas diffusion layer which is untreated.

Figure 9:
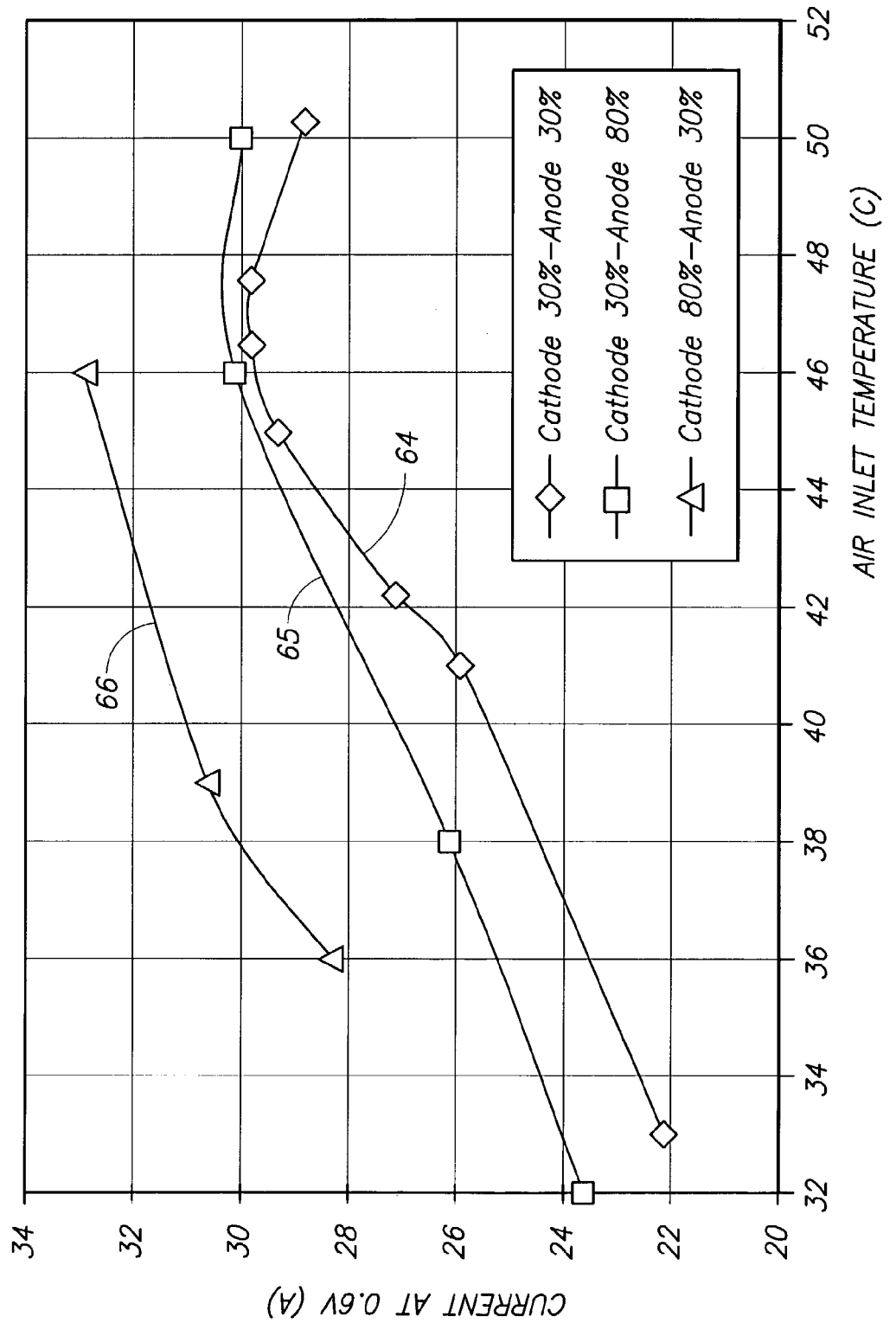
FIG. 9 is a graphic depiction of the performance of several fuel cell examples, and which demonstrate some aspects of the present invention.

Referring now to FIG. 9, a graph is provided of a fuel cell current at 0.6 volts in Amps versus an air inlet temperature in degrees C for several ion exchange membranes 11 having current collectors 40 with varying amounts of open area expressed as a percentage. For example, the line labeled 64 depicts the performance of a fuel cell incorporating an ion exchange membrane 11 and which has cathode and anode current collectors 40 which each have about 30% open area. In this regard, it should be understood that the term "open area" is defined as the cumulative area defined by the plurality of apertures 42. Line 65 depicts the performance of a fuel cell which has a cathode current collector having an open area percentage of 30% and an anode current collector having an open area percentage of about 80%. It will be noted that line 65 depicts enhanced performance (voltage output and operating temperature) relative to the line 64. It is speculated that the smaller degree of open area of the anode current collector 40 encourages the retention or preservation of water by the ion exchange membrane 11. This is believed to allow the MEDLA 10 to operate at a higher electrical output and at the elevated operational temperature. As should be understood, elevated operating temperatures, as reflected by the air inlet temperature, causes the evaporation of water from the ion exchange membrane 11. This evaporation typically causes a reduction in electrical output from the fuel cell. Line 66 depicts the performance of yet another fuel cell incorporating an ion exchange membrane 11 and which has a cathode current collector 40 having an open area percentage of about 80% and an anode current collector percentage of about 30%. In relative comparison with line 65, line 66 continues to clearly show improved performance characteristics. Therefore, it is clear, from this drawing, that varying the open area percentage of the anode and cathode current collectors has a direct effect on the performance of a fuel cell.

Figure 10:
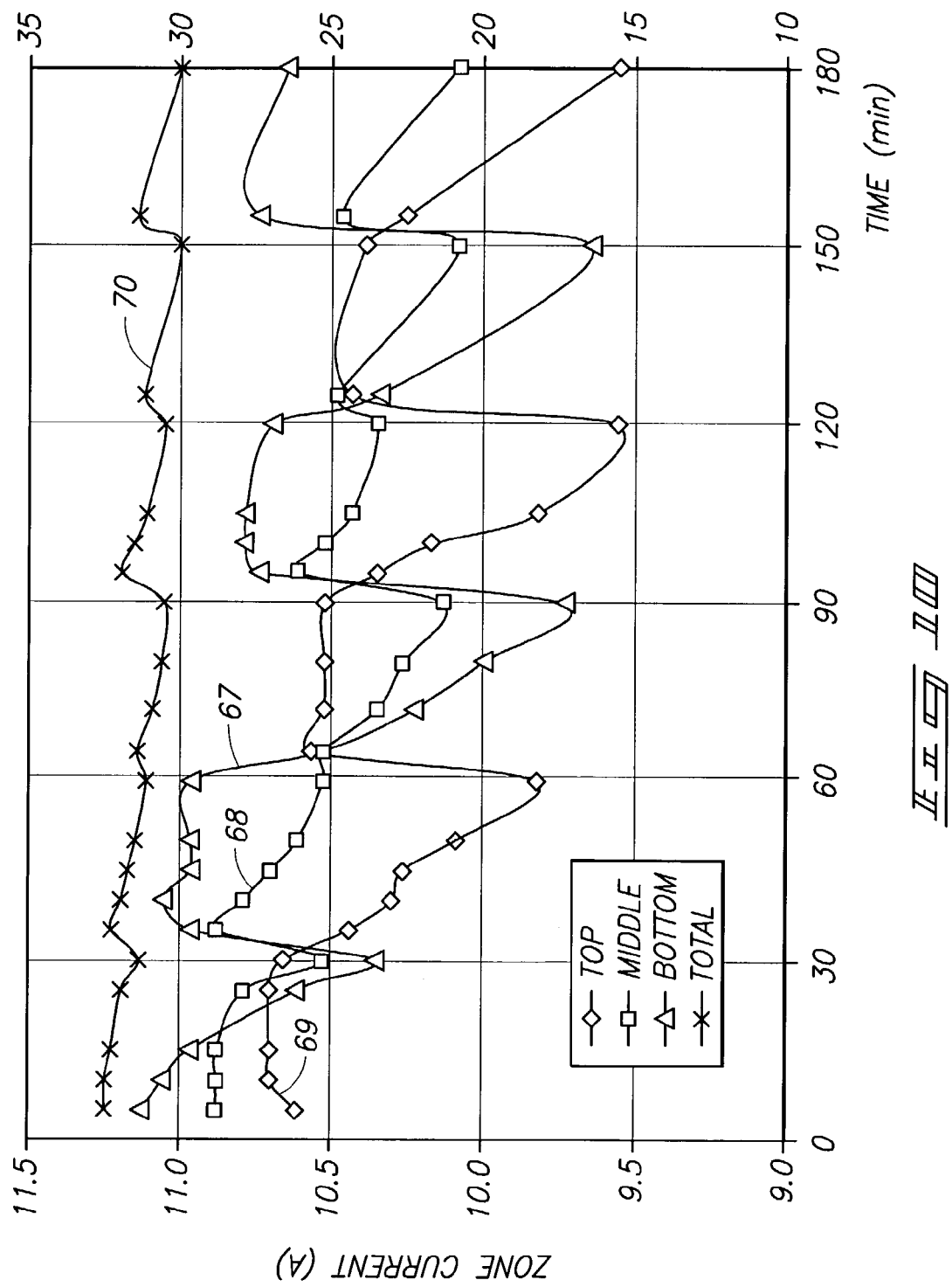
FIG. 10 is a graphic depiction of the performance of a fuel cell as it relates to the location where a fuel gas is introduced relative to a membrane electrode diffusion layer assembly incorporated with same.

Referring now to FIG. 10, a graph is provided and which depicts the relationship of current, as expressed in Amps, for a fuel cell having current collectors 40 having a top, middle, and bottom zones, versus time. These relationships are compared and contrasted with respect to the direction of a fuel gas flow in that same fuel cell. Lines 67–70 generally depicts declining fuel cell performance over time and then sudden improvement when the direction of fuel gas flow is changed, or reversed. It should be noted that each zone of the current collector 40 which is graphically identified shows some degree of decline over time. Line 67 depicts the current output of a fuel cell having a current collector 40, and where fuel gas is first fed into the fuel cell, at a location which is near the bottom of the current collector 40. As discussed above, the current output significantly declines over time. This is believed to be caused by the evaporation of water from the ion exchange membrane 11 as the fuel gas enters the fuel cell. In this regard, it should be understood that the fuel gas is quite dry upon entering the fuel cell, and can therefore absorb water from the adjacent regions of the ion exchange membrane 11. As the fuel gas travels along the ion exchange membrane 11, its relative humidity increases until it exits the fuel cell. Employing this reasoning, it will be seen that the middle of current collector shows a decline in performance, but this rate of decline is not as rapid as the area of the MEDLA 10 which is adjacent to the location where the fuel delivery takes place. Still further, it will be seen that the area of the MEDLA 10 and current collector 40 which are farthest away from the location where fuel delivery takes place, has a relative steady state performance which would appear to suggest that no significant evaporation or dissipation of water is taking place in that region in view of the moisture saturated state of the fuel gas. It will be noted that when the direction of fuel gas delivery is reversed, those portions of the current collector which have been performing poorly suddenly improve. For example, and referring again to line 67, it will be seen that when the delivery location of the fuel gas is moved to a location at the opposite end of the fuel cell or MEDLA 10, the performance of the adjacent region of the MEDLA 10 and current collector 40 rapidly improves. This would appear to be explained by the fact that this adjacent region, which was previously dry, is now receiving fuel gas which is quite humidified. As a result of this humidification, or as a result of not experiencing a significant loss of water in that region of the ion exchange membrane 11, the electrical performance of that MEDLA region immediately improves. This same relationship is seen also with respect to lines 68 and 69. Therefore, FIG. 10 appears to show that hydration is not uniform across the face of the MEDLA 10, and the amount of hydration of the ion exchange membrane 11 depends, at least in part, on the direction of fuel gas flow. Line 70 depicts the overall fuel cell performance over time as contrasted with the changes in duration of the fuel cell gas delivery relative to the current collector 40, and the underlying MEDLA 10.

Referring now to FIG. 11, a graph is shown and which illustrates the effect of porosity on the power output of an ion exchange membrane 11 which is incorporated into a fuel cell. Each of the examples as will be discussed below includes a MEDLA 10 which has porous metal coating applied thereto. This metal coating will be discussed in greater detail hereinafter. For example, line 73 depicts the performance of an ion exchange membrane 11 having an anode which has a porous metal coating having a porosity of 30 seconds Gurley, and a cathode having a porous metal coating, and which has a porosity of 30 seconds Gurley. Further, lines 74 and 75 depicts the performance of an ion exchange membrane 11 having an anode with a porous metal coating having a porosity of about 400 seconds Gurley and a cathode with a porous metal coating having a porosity of about 120 seconds Gurley. The differences in performance as depicted by lines 74 and 75 is due to a different construction of the gas diffusion layer 22 which is made integral with the MEDLA 10. It is believed that the increased porosity of the metal coating covering the anode and cathode contributes to the loss of water from the ion exchange membrane 11 during operation. As earlier discussed, inadequate hydration of the ion exchange membrane 11 will tend, over time, to reduce the electrical power output of the ion exchange membrane 11. Still further, a decrease in the porosity of the metal coating, as evidenced by increased Gurley numbers, causes increased amounts of water to be retained by the ion exchange membrane 11. This would tend to enhance the electrical performance of the ion exchange membrane 11.

Referring now to FIG. 12, another alternative form of membrane electrode diffusion layer assembly 10 is shown and which is useful when incorporated into an ion exchange membrane fuel cell which will be discussed in greater detail hereinafter. As seen in this form of the invention, an ion exchange membrane 80 such as may be purchased under the trade name "Nafion" is provided. As earlier discussed this ion exchange membrane is a thin, flexible and sheet-like material which is made typically from a sulfonated fluoropolymer. This ion exchange membrane has opposite anode and cathode sides 81 and 82 respectively. As seen in FIG. 12, an electrode layer 83 is disposed in ion exchanging relation relative to the respective anode and cathode sides 81 and 82 respectively. The electrode layer 83 is of conventional design. This electrode layer facilitates the creation of ions which subsequently move across the ion exchange membrane 80. Each electrode layer 83 has an outwardly facing surface 84. A micro-diffusion layer, or first portion 85, having a given degree of porosity is juxtaposed relative to the outwardly facing surface 84 of the electrode layer 83. The micro-diffusion layer 85 comprises a carbon based slurry which may be modified, as earlier discussed, to provide different levels of porosity and hydrophobicity for the anode and cathode sides 81 and 82 respectively. This of course may be varied in X, Y and/or Z axes. Still further the porosity (permeability) and hydrophobicity of the micro-diffusion layer 85 may be manipulated, as discussed above, in various ways to achieve various desired performance characteristics such as providing effective hydration of the ion exchange membrane 80. Yet further while the micro-diffusion layer 85 is shown as a single layer the micro-diffusion layer may comprise individually discrete layers each having a different porosity (permeability) and hydrophobicity. Similarly, as was discussed earlier with respect to FIGS. 1–4, the hydrophobicity and porosity of each of these several layers may be varied substantially in a direction along the major surface 25. The micro-diffusion layer has an outwardly facing surface 86.

Referring still to FIG. 12, it will be seen that a macro-diffusion layer or second portion 90 is provided and which is juxtaposed relative to the outwardly facing surface 86 of the micro-diffusion layer 85. The macro-diffusion layer 90 comprises, in one form, a carbon fiber based sheet having a porosity (permeability), which is, as a general matter, greater than the porosity (permeability) of the micro-diffusion layer 85. This macro-diffusion layer may be commercially purchased under the trade name "Toray" from various commercial sources. The micro-diffusion layer 85 and the macro-diffusion layer 90 in combination define a gas diffusion layer (GDL) which is generally indicated by the numeral 100. The gas diffusion layer 100 has an outwardly facing surface area 101 which has a surface texture or topology. It should be understood that the gas diffusion layer 100 while described herein as including both the macro-diffusion layer 90 and a micro-diffusion layer 85 may, in some forms of the invention, include only one of these two previously described diffusion layers. It being understood that FIG. 12 shows a preferred form of practicing the invention. The porosity (permeability) and hydrophobicity of the macro-diffusion layer 90 may be varied in assorted ways in the X, Y and Z axes. The gas diffusion layer 100 has an outwardly facing surface 101.

Referring still to FIG. 12 it will be seen that a porous metal coating 110 comprising one or more elements selected from the Periodic Table of Elements and which has an atomic number of 13 to 75 is positioned at least in partial covering relation relative to the outwardly facing surface area 101 of the gas diffusion layer 100. This metal coating forms a resulting metalized gas diffusion layer 100. The porous metal coating 110 may comprise an alloy; oxide; nitride; or carbide. In FIG. 12 the gas diffusion layer 100 and the porous metal coating 110 are disposed on both the anode and cathode sides 81 and 82. However, it will be appreciated that the gas diffusion layer 100, and the porous metal layer 110 may be disposed on only one of the anode or cathode sides 81 and 82 respectively. Yet further it is possible to fabricate a membrane electrode diffusion layer assembly 10 wherein the gas diffusion layer 100 is located on both the anode and cathode sides 81 and 82 respectively and the porous metal coating 110 is positioned on only one of the anode or cathode sides.

As discussed above, the gas diffusion layer 100 has an outwardly facing surface 101 having a surface texture or topology. Further, the porous metal coating 110 is applied in a fashion to the outwardly facing surface 101 such that it substantially conforms to the topology. In this regard the porous metal coating is applied in an amount of about 8 to about 150 milligrams of porous metal per square centimeter of the outwardly facing surface area 101. Moreover the porous metal coating 110 is applied in an amount and in a fashion which causes the resulting gas diffusion layer 100 to have an air impedance of about 15 to about 1,000 Gurley seconds. Gurley is defined in this application by the use of a Gurley Model 4118 (low pressure) 0.1 square inch orifice at a flow rate of about 100 cubic centimeters. As will be appreciated from studying FIG. 12, the porous metal coating 110 may be continuous as depicted in that view; or it may be discontinuous based upon other design concerns and desired fuel cell performance parameters. For example, the varied application of the porous metal coating 110 in combination with varying the hydrophobicity of the various portions of the gas diffusion layer 100 has the effect of providing substantially optimal hydration for the underlying ion exchange membrane 80.

The porous metal coating 110, may include a substantially homogenous metal or the respective alloys, oxides, nitrides and carbides of same. The metal coating 110 has a density of about 2.0 to about 19.0 grams per cubic centimeter. The porous metal coating may comprise nickel, iron, stainless steel, manganese, zinc, chromium, copper, zirconium, silver, titanium and tungsten and their alloys, nitrides, oxides and carbides. For example, when the porous metal coating 110 is formed of nickel, this metal is deposited in an amount of about 28 to about 150 milligrams per square centimeter of surface area. On the other hand, when a porous metal coating of aluminum is employed it is deposited in an amount of about 8 to about 40 milligrams per square centimeter of surface area. As a general matter the porous metal coating 110 has an average thickness of about 25 to about 400 micrometers. The porous metal coating 110 is applied by conventional metal spraying techniques which are well known in the art, and further discussion of these techniques is neither warranted nor required in this application.

As will be understood from FIGS. 1–4 and FIG. 12, the porous metal coating 110 is borne by the outwardly facing surface 101 of the gas diffusion layer 22, 100 and is operable to vary both the hydrophobicity and/or porosity of the gas diffusion layer when the hydrophobicity is measured in a direction substantially along the major surface 25 as seen in FIGS. 1–4. As discussed above, the hydrophobicity and/or porosity of the gas diffusion layer 100 may be varied by the selective application or deposit of the metal coating 110 to provide favorable hydration conditions for the ion exchange membrane 80. Yet further, the deposit or application of the metal coating is varied to provide an enhanced current density for the ion exchange membrane 80, as will be discussed in greater detail below.

As noted above, porous metal coating 110 can be deposited in a manner which provides a continuously or selectively variable hydrophobicity and/or porosity for the gas diffusion layer 100. For example, the deposit of the porous metal coating 110 can be done in a manner to provide a plurality of discrete zones 30 which each have different, yet substantially constant hydrophobicity and/or porosity. Still further, in another alternative form of the invention, the porous metal coating 110 can be deposited in a manner to provide a plurality of discrete zones 30, and wherein at least one of the zones has a continuously variable or different hydrophobicity and/or porosity, and wherein the hydrophobicity and/or porosity of the respective zones are variable or have different relative values.

Referring still to FIG. 12 a fuel cell employing a MEDLA 10 will also include as discussed earlier, a pair of current collectors 40, and at least one of these current collectors will rest in ohmic electrical contact against the porous metal coating 110. As noted earlier, the current collector 40 has a main body 41 which has open areas or apertures 42 formed therein, and which allows a source of fuel 14, such as hydrogen (on the anode side 12); and an oxidant supply 15, such as oxygen (on the cathode side 13); to reach the underlying porous metal coating 110, and associated gas diffusion layer 100. The current collector 40 is typically fabricated from a metal or metal alloy, and/or has a metal coating; cladding; or plating formed of nickel or similar metals. As noted above, the current collector 40 transmits force or pressure 121 which is applied thereto and which maintains the current collector in ohmic electrical contact with the underlying porous metal coating 110. During subsequent fuel cell operation, contact resistance 120 is established between the main body 41 of the current collector 40, and the porous metal coating 110. In this regard with respect to the contact resistance, it has been discovered that the contact resistance, in the present arrangement, is substantially constant and independent of the force applied by way of the current collector 40. In this arrangement, therefore, as shown in FIG. 12, the contact resistance 120 remains substantially constant and independent of the force 121 applied by way of the current collector 40, and the gas diffusion layer 100 has a variable hydrophobicity and/or porosity when measured in a direction which is substantially along the major surface 25. This particular arrangement, therefore, provides for substantially optimal hydration of the ion exchange membrane 80 while simultaneously providing an enhanced current density, and a force independent contact resistance.

Fuel cells are often modeled as a current source in series with a capacitance, and an accompanying electrical resistance. This electrical resistance is referred to as equivalent series resistance or ESR. The ESR of a typical fuel cell comprises, as a general matter, the electrical resistance of the membrane electrode diffusion layer assembly 10 plus the contact resistance 120 which is established between the membrane electrode diffusion layer assembly 10 and the adjacent current collector as shown at 40 (FIG. 12). In the present invention the ESR of the membrane electrode diffusion layer assembly 10 is substantially independent of the force or pressure applied to same. In relative comparison, the contact resistance 120 which exists between the MEDLA 10 and the adjacent current collector 40 in prior art assemblies, is typically a function of pressure or force which is applied by the current collector.

Figure 13:
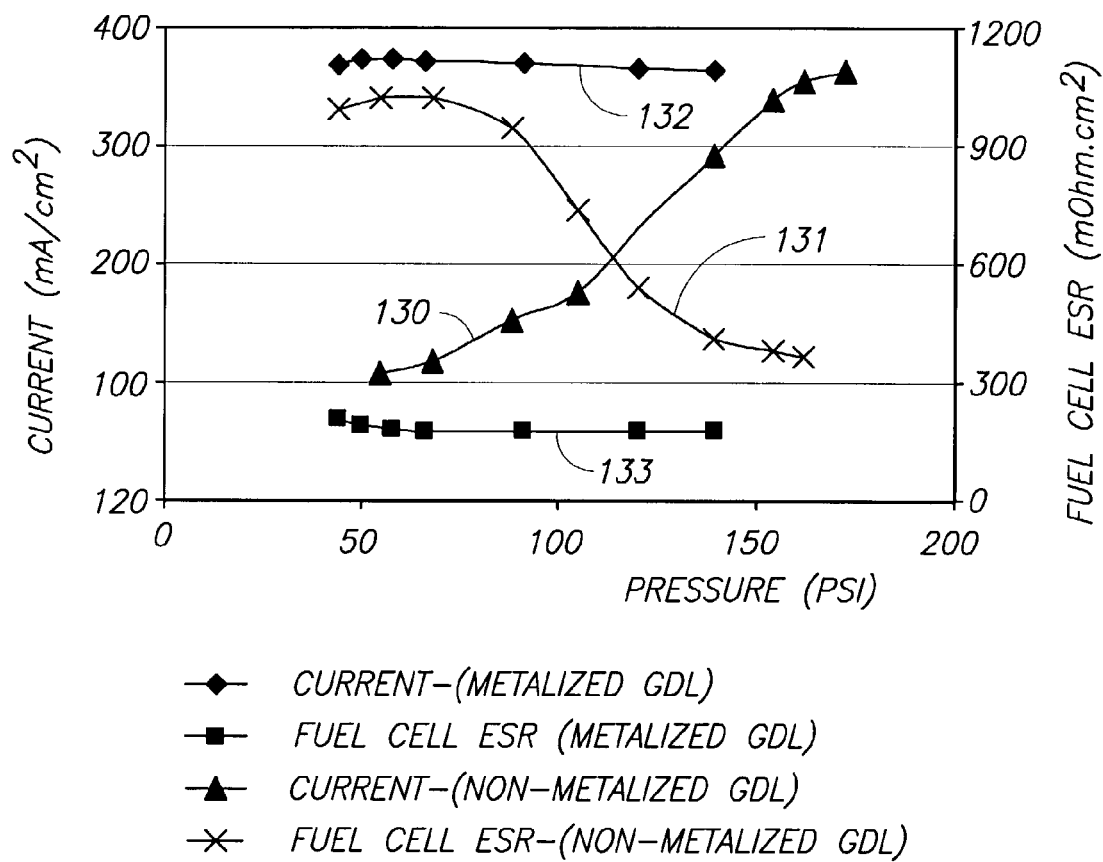
FIG. 13 is a graphic depiction of current density; pressure; and fuel cell ESR for a fuel cell employing a membrane electrode diffusion layer assembly of the present invention.

Referring now to FIG. 13, a graph is provided and which shows the relationship of the current produced; fuel cell ESR; and pressure for two different ion exchange membrane fuel cells, each having an approximately 16 square centimeter active, electrode surface area. Each fuel cell utilizes a stainless steel current collector. In this graphic depiction, the earlier prior art relationships are clearly seen. In this regard the line label 130 shows the operational response of a prior art fuel cell which has a membrane electrode diffusion layer assembly 10 with no accompanying porous metal coating 110. As would be expected, as increasing pressure 121, expressed in terms of pounds per square inch, is applied to the current collector 40, the resulting electrical current output (as expressed in milliamps per square centimeter surface area of the active electrode surface area 83) is shown to rise proportionately. Conversely, and referring to the line labeled 131, for the same prior art ion exchange membrane fuel cell which does not have a porous metal layer or coating 110, it will be seen that the application of increasing pressure or force by way the current collector results in a decrease in the fuel cell ESR. Since the ESR of the membrane electrode diffusion layer assembly 10 is a constant, and substantially independent of the force 121 applied by the adjoining current collector 40, the change in the fuel cell ESR is due almost entirely to a change in the contact resistance. This ESR is expressed in milliohms per square centimeter of surface area. The relationship between current output and pressure applied is quite clear relative to using a prior art non-metalized gas diffusion layer, that is, the application of increasing amounts of pressure results, on the one hand, with decreasing contact resistance, and on the other hand, a corresponding increase in current output of the prior art fuel cell.

Referring still to FIG. 13, the performance of the present invention is graphically depicted with respect to the lines labeled 132 and 133 respectively for a second fuel cell which includes a metalized gas diffusion layer 100. As seen in FIG. 13, line 132 depicts a fuel cell with a stainless steel current collector 40, and wherein the gas diffusion layer 100 of the membrane electrode diffusion layer assembly 10 has a porous metal coating 110 applied thereto. Line 132 illustrates that the current output (as expressed in milliamps per square centimeter of surface area) is substantially constant when exposed to increasing amounts of pressure as applied to, or by way of, the current collector 40. This is, of course, in stark contrast to line 130 which shows the relationship of pressure and current output in a fuel cell which does not have a metal coating 110 applied to the gas diffusion layer 100. Still further line 133 shows the same fuel cell having a porous metal layer or coating 110 applied to the gas diffusion layer 100, and wherein it will be seen that the fuel cell ESR (as expressed in milliohms per square centimeter of surface area) and thus contact resistance, remains substantially constant at pressures of less than about 300 pounds per square inch as applied by the current collector 40. Still further, line 132 and 133 demonstrate that a fuel cell incorporating the MEDLA 10 will operate at pressures which would render most prior art fuel cells nearly inoperable or commercially unattractive in view of the relatively low current outputs that it would provide.

The arrangement as seen in FIG. 12 provides a means by which a relatively inexpensive, and cost efficient fuel cell may be readily assembled while avoiding many of the shortcomings attendant with the prior art practices which include applying relatively sizeable amounts of force 121 in order to provide effective electrical contact between the adjacent current collector 40 and the porous metal coating 110. In addition to the foregoing, one of the perceived shortcomings of the prior art fuel cell designs has been the propensity for such fuel cells to cause the ion exchange membrane 11 to have various regions which have higher relative temperatures than adjacent regions. These higher temperatures have been caused, in part, due to non-uniform hydration of the ion exchange membrane. Further, this is often exacerbated by other design consideration which call for relatively high pressure to be applied in order to effect a lower contact resistance, and higher current outputs. In the present invention however, the gas diffusion layer 100 which is located adjacent to each electrode 83 has a variable hydrophobicity which provides an appropriate degree of hydration for the variable temperature regions that may be created on the ion exchange membrane 80, and which may be caused by the particular design of the fuel cell. The gas diffusion layer 100 which is located adjacent to each electrode 83 may have a plurality of zones 31–33 each having a variable hydrophobicity, and which provides an appropriate hydration for variable temperature regions which may occur on the anode side, cathode side or both sides thereof. Still further, a current collector 40 is provided and which has a surface area which defines a plurality of variably sized open areas or apertures 42 and which are distributed in a pattern which facilitates heat dissipation and the substantially uniform hydration of the membrane electrode diffusion layer assembly 10.

Therefore, the present invention provides a method of optimizing the operation of a fuel cell which includes providing a fuel cell having an ion exchange membrane 80 with opposite anode and cathode sides 81 and 82, and a surface area; determining the surface area temperature of the ion exchange membrane during operation of the fuel cell to identify regions of the ion exchange membrane which have different temperatures and correspondingly different operational hydration requirements; providing a gas diffusion layer 100 made integral with the ion exchange membrane 80 and which has a variable hydrophobicity and which provides for substantially optimal hydration of the regions of the ion exchange membrane which have a different surface temperature and operational hydration requirements; providing a current collector disposed in ohmic electrical contact with one of the anode or cathode sides and which defines a plurality of variably sized open areas or apertures 42 which are distributed in a pattern which facilitates heat dissipation and hydration of the ion exchange membrane 80; and regulating the operational temperature of the fuel cell. This temperature regulation is achieved by means of the fuel cell module construction which is discussed in greater detail, below.

Figure 14:
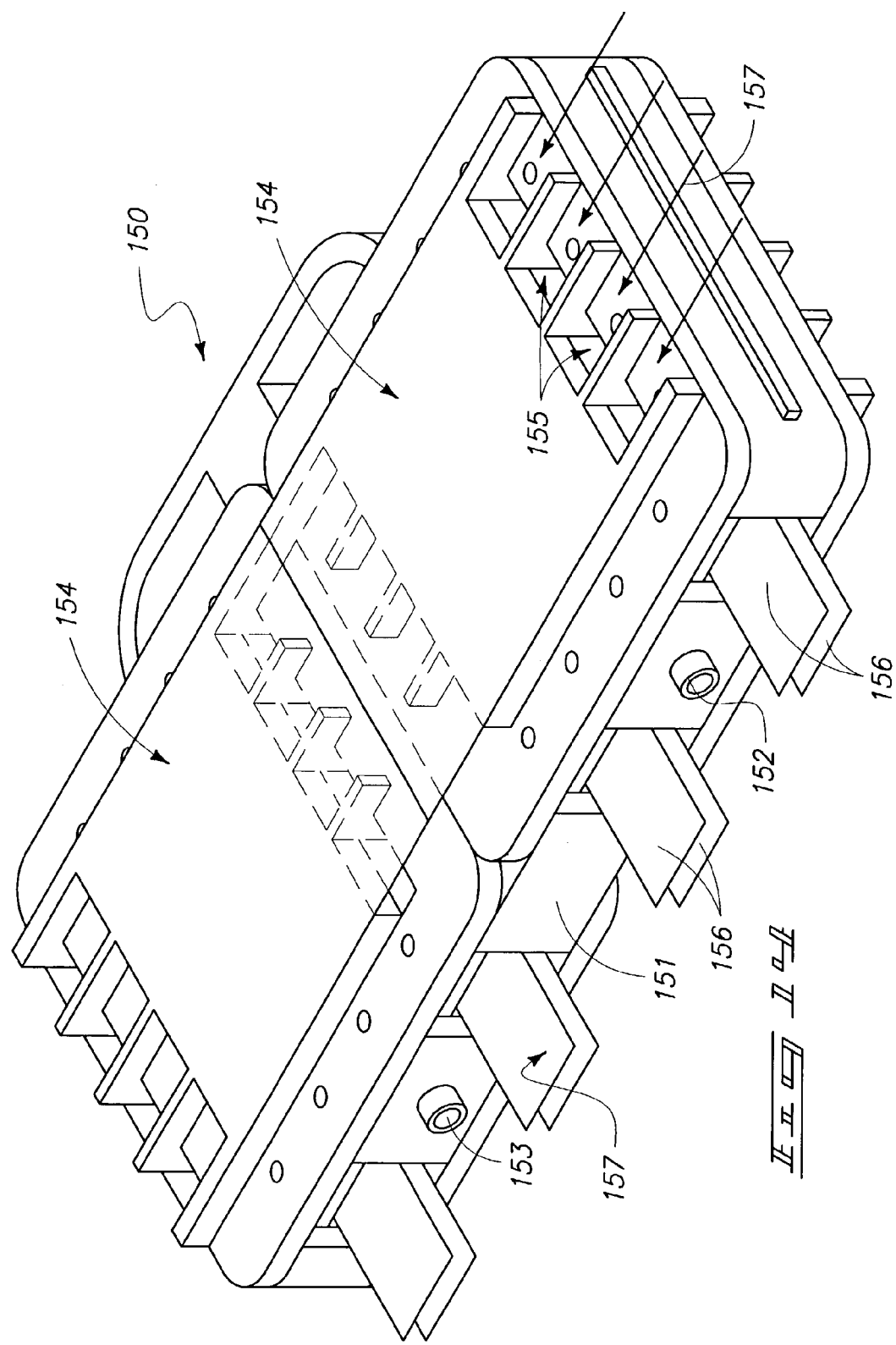
FIG. 14 is a perspective, side elevational view of an ion exchange membrane fuel cell module which employs the teachings of the present invention.

Referring now to FIG. 14, a first form of an ion exchange fuel cell module which may incorporate the teachings of present invention 10 is generally indicated by the numeral 150. The fuel cell module, as illustrated, is discussed in significant detail in U.S. Pat. No. 6,030,718 the teachings of which are incorporated by reference herein. As a general matter, the fuel cell module 150, as shown, has a main body 151 which defines internal cavities (not shown) and which receive individual membrane electrode diffusion layer assemblies 10 as illustrated in FIGS. 1–4. In this arrangement, the anode surfaces 12 face inwardly toward these cavities defined by the main body 151, and the cathode sides 13 face outwardly so that they may be exposed to a stream of air which passes over the surface thereof. As should be understood from a study of FIG. 14, and the teachings of U.S. Pat. No. 6,030,718, multiple modules 150 are combined together into an ion exchange membrane fuel cell power system which is similar to that shown in FIG. 13. Still further, the multiple modules each enclose at least one ion exchange membrane. Still further the ion exchange membrane fuel cell power system is arranged such that at least one of the modules can be operationally disabled and removed from service, by hand, while the remaining modules continue to operate. Still further it should be understood that the fuel cell modules 150 produce heat energy during operation. Additionally, each module 150 has an airflow which regulates the operational temperature of each module by removing a preponderance of the heat energy therefrom. In this regard, the first form of the ion exchange membrane fuel cell module 150 has a fuel intake port 152 formed in the main body 151 and which supplies the fuel 14 to the anode sides 12 of the membrane electrode diffusion layer assemblies 10 which are enclosed therein. Still further the main body 151 defines a byproduct exhaust port 153 which removes waste water, unreacted fuel gas and any other resulting byproducts from the anode sides of the membrane electrode diffusion layer assemblies 10. Still further cathode covers 154 cooperate with the main body 151 and exert force on adjacent current collectors 156 which are placed into ohmic electrical contact relative to the individual membrane electrode diffusion layer assemblies 10. As seen in FIG. 14, the cathode covers 154 define cathode air passageways 155 which allow a stream of air to move therethrough and into contact with the cathode side 13 of the membrane electrode diffusion layer assemblies 10. In this arrangement a cathode airflow 157 is operable to remove a preponderance of the heat energy generated during ion exchange membrane fuel cell module operation. As seen in FIG. 14 current collectors 156 are provided and which are received internally of the main body 151. The current collectors each have an electrically conductive tab 157 which extends outwardly relative to the main body 151 and which may be selectively electrically coupled with an electrical bus (not shown) and which is made integral with an ion exchange membrane fuel cell power system.

Figure 15:
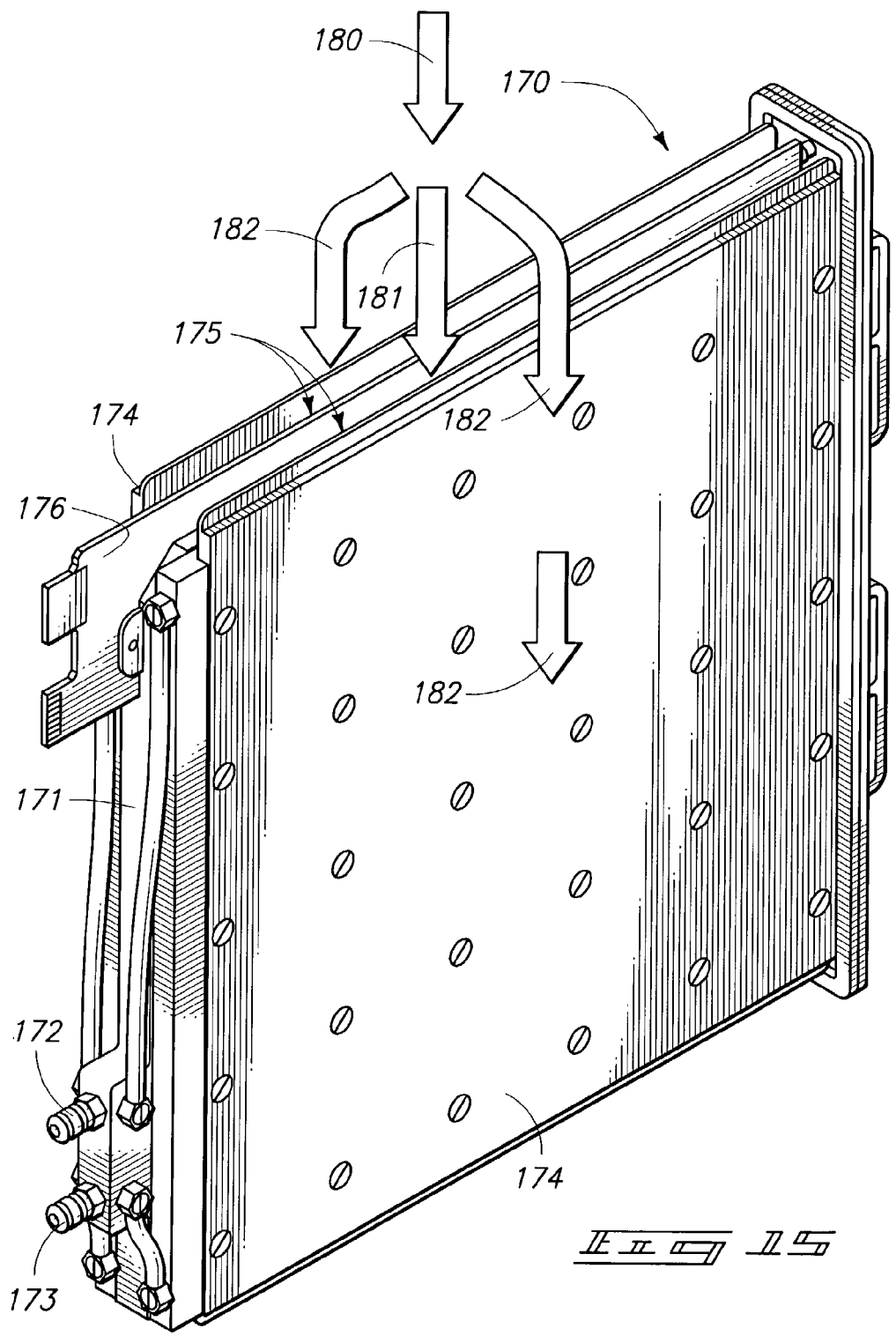
FIG. 15 is a perspective view of a second form of an ion exchange fuel cell module which employs the teachings of the present invention.

A second form of an ion exchange membrane fuel cell module which may incorporate the MEDLA 10, and the other teachings of the present invention is shown at numeral 170 in FIG. 15. This second form of the ion exchange membrane fuel cell module is discussed with greater specificity in U.S. application Ser. No. 09/577,407 (Now U.S. Pat. No. 6,468,682), the teachings of which are incorporated by reference herein. As a general matter, however, the second form of the ion exchange membrane fuel cell module 170 has a main body 171 which includes a fuel inlet port 172 which delivers a fuel gas 14 to the anode side 12 of the MEDLAs 10 which are enclosed in the fuel cell module 170. Still further the main body 171 also includes a byproduct exhaust port 173 which removes any unreacted fuel gas 14, and any byproducts, such as water from the main body 171. As seen in FIG. 15, the second form of the ion exchange membrane fuel cell module 170 includes opposite anode heat sinks 174 which are disposed in heat removing relation relative to the anode side of the MEDLAs 10 which are incorporated therein. In the arrangement as shown in FIG. 15, at least two MEDLAs 10 are oriented in spaced relationship, one to the other. In this fuel cell module 170, the cathode sides 13 of the respective ion exchange membranes 11 are proximally related, and the anode sides 12 of the respective ion exchange membranes 11 are distally related. The cathode sides are oriented in spaced relation one to the other, and along a cathode air passageway which is generally indicated by the numeral 175. Located in electric current removing relation relative to each of the ion exchange membranes 11 is a current conductor assembly 176 which is operable to releasably electrically couple with an electrical bus (not shown) and which is made integral with a ion exchange membrane exchange fuel cell power system as will be discussed below. As seen in FIG. 15, the ion exchange membrane fuel cell module 170 is provided with a cathode airflow which is generally indicated by the numeral 180. The cathode air flow is bifurcated to provide a first air stream 181 which enters the fuel cell module 170 and passes along the cathode air passageway 175. Still further, a second air stream 182 provides airflow streams that move across the respective anode heat sinks 174. The second air stream 182 regulates in part, the operational temperature of the ion exchange memory fuel cell module 170 by removing a preponderance of the heat energy generated by the ion exchange membrane fuel cell module therefrom. Also in the present arrangement, the first air stream which passes through the cathode air passageway 175 removes less than a preponderance of the heat energy produced during operation of the ion exchange membrane fuel cell module 170.

Figure 16:
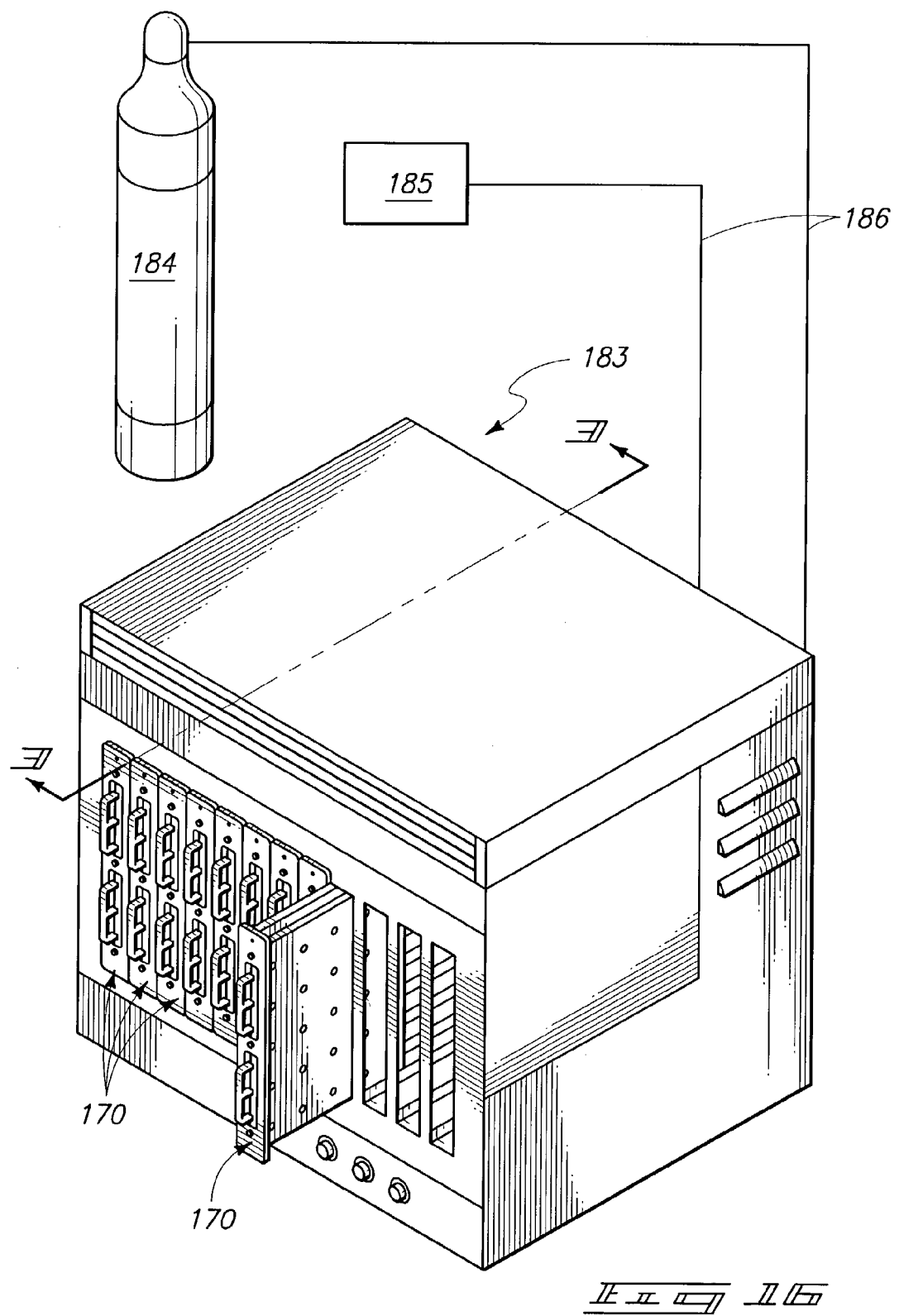
FIG. 16 is a perspective view of an ion exchange membrane fuel power system which may incorporate the teachings of the present invention as shown in FIG. 9.

Referring now to FIG. 16 an ion exchange membrane fuel cell power system is shown and which is generally designated by the numeral 183. As will be seen, multiple ion exchange membrane fuel cell modules 170 are provided. As was the case with the first form of the ion exchange membrane fuel cell module 150, at least one of the modules 170 can be operationally disabled and removed from service by hand, while the remaining modules 170 continue to operate. As seen, the fuel cell power system 183 is provided with a source of fuel which is generally indicated by the numeral 184. The source of fuel may include bottled hydrogen 184 or other similar fuel gases which may be supplied to the respective modules. Still further, a chemical reformer 185 may be provided and which may operate to take a source of a suitable hydrocarbon and react it in such a fashion so as to release a fuel gas, such as hydrogen, which may then be consumed during operation of the ion exchange membrane fuel cell modules 170. The source of fuel gas 183 and/or the chemical reform 184 is coupled to the fuel cell power system 182 by appropriate conduits 186.

Operation

The operation of the described embodiments of the present invention are believed to be readily apparent and are briefly summarized at this point.

The present invention is best understood by a study of FIGS. 1–4, 9, 14 and 15. As shown therein, a fuel cell such as 150 and 170 includes an ion exchange membrane 11 having opposite anode and cathode sides 12 and 13, respectively, and which, during operation, produces water which hydrates the ion exchange membrane, and heat energy. Still further, and as seen more specifically in FIGS. 1 and 12, a current collector 40 is disposed in ohmic electrical contact with each of the anode and cathode sides. At least one of the current collectors 40 has a surface area which defines a plurality of variably dimensioned open areas or apertures 42 which are distributed in a pattern and which facilitates heat dissipation and the substantially uniform hydration of the ion exchange membrane 11.

More specifically and as described herein, a fuel cell 150 or 170 such as seen in FIGS. 14 and 15 is provided and which encloses an ion exchange membrane 11 having opposite anode and cathode sides 12 and 13, and which further has a first and second locations 34 and 35 on the ion exchange membrane. An electrode 20 is positioned on each of the anode and cathode sides, and a gas diffusion layer 22 is borne by at least one of the electrodes. The gas diffusion layer has a variable hydrophobicity when measured in a direction between the first and second locations 34 and 35. A porous metal coating 110 is disposed on the gas diffusion layer and which has a variable porosity when measured in a direction between the first and second locations. A source of a fuel gas 14 is supplied to the first location on the anode side of the ion exchange membrane 11. The fuel cell produces water during operation, and excessive fuel gas and water is removed from the ion exchange membrane at the second location 35. The water produced during operation is utilized to hydrate the ion exchange membrane 11. A current collector 40 is disposed in ohmic electrical contact with each of the anode and cathode sides 12 and 13, respectively. At least one of the current collectors 40 has a plurality of openings or apertures 42 which are disposed in an arrangement which varies when measured in a direction between the first and second locations. Still further, an airflow 15 is provided to the cathode side of the ion exchange membrane 11. The fuel cell produces heat during operation and the variably hydrophobic gas diffusion layer 22, porous metal coating 110, current collector 40, and airflow 15 provides substantially uniform hydration for the ion exchange membrane 11 during fuel cell operation.

In the several forms of the invention as described, multiple fuel cell modules such as what is shown at 150 and 170 are provided. These multiple modules each enclose at least one ion exchange membrane 11. The respective fuel cell modules 150, 170 may be incorporated into an ion exchange membrane fuel cell power system as exemplified by the numeral 183, and at least one of the fuel cell modules can be operationally disabled and removed from service, by hand, while the remaining fuel cell modules continue to operate. As earlier discussed each of the fuel cell modules produce heat energy during operation, and each fuel cell module has an airflow such as what is shown at 157 and 180, and which regulates the operational temperature of each fuel cell module by removing heat energy therefrom while simultaneously providing the oxidant supply necessary to maintain fuel cell operation. As earlier discussed with one form of the invention, the cathode airflow 157 may remove a preponderance of the heat energy therefrom. In an alternative form of the invention, the cathode airflow 180 may remove less than a preponderance. As seen with respect to FIG. 15 the cathode airflow 180 is bifurcated into first and second streams 181 and 182, and wherein one of the streams 182 passes over the anode heat sinks 174 and removes a preponderance of the heat energy generated during fuel cell operation therefrom.

As discussed earlier in this application, the gas diffusion layer 22, 100 may have a variable hydrophobicity. This gas diffusion layer 22, 100 may be located on the anode side 12, cathode side 13 or both sides. Still further the gas diffusion layer may have a variable porosity (permeability) which may be varied when measured in the X, and/or Y axes. Still further, and as discussed earlier in this application, the hydrophobicity and/or porosity may be varied to provide both substantially uniform hydration, and an enhanced current density for the ion exchange membrane 11. This hydrophobicity and porosity (permeability) may be substantially continuously variable or in a plurality of zones which may be constant or continuously variable to address temperature variations which may be present along the major surface 25. In each instance, the hydrophobicity and/or porosity may be varied in a number of different ways such as by providing a gas diffusion layer 22, or a gas diffusion layer 100 which may incorporate a porous metal layer 110, in order to provide optimal hydration and enhanced current density for the ion exchange membrane 11.

As discussed earlier in this application a fuel cell is described and which may have an ion exchange membrane 11 having opposite anode and cathode sides 12 and 13 respectively. An electrode 20 is provided and which is disposed in ohmic electrical contact relative to each of the anode and cathode sides. Further a gas diffusion layer 22, 100 is provided and positioned on at least one of the anode and cathode sides 12 and 13 respectively, and which has length, width and thickness dimensions and wherein the length and width dimensions define a major surface 25, and wherein the gas diffusion layer is juxtaposed relative to the electrodes 83, and a porous metal coating 110 is provided, and is borne by the gas diffusion layer and which varies the hydrophobicity of the gas diffusion layer when the hydrophobicity is measured in a direction substantially along the major surface. In addition to providing an ion exchange membrane 80 which has improved hydration and current densities, the present arrangement also provides for a substantially constant and force independent contact resistance to be established between the porous metal coating 110 and an adjacent current collector 120.

Therefore it will be seen that the present invention provides many advantages over the prior art and substantial cost savings can be realized in manufacturing ion exchange membrane fuel cell modules which have enhanced performance characteristics in relative comparison to the prior art devices while simultaneously avoiding many of the detriments associated with the prior art practices.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fuel cell comprising:
   an ion exchange membrane having opposite anode and cathode sides; and
   a current collector disposed in ohmic electrical contact with each of the anode and cathode sides, and wherein at least one of the current collectors has a surface area which defines a plurality of variously sized openings which are distributed in a predetermined pattern, and which provides for effective operational hydration for the ion exchange membrane.

2. A fuel cell as claimed in claim 1, wherein the ion exchange membrane, during operation, has regions which have a higher temperature than an adjacent region and wherein the variously sized openings are smaller in size in the regions which have a higher temperature, than regions adjacent thereto which have a lower relative temperature.

3. A fuel cell as claimed in claim 1, wherein the ion exchange membrane during operation has regions having lower amounts of hydration in relative comparison to adjacent regions, and wherein the variously sized openings in the regions having lower relative hydration are smaller in size in relative comparison to those openings disposed arid in the regions having a greater degree of hydration.

4. A fuel cell as claimed in claim 1, wherein the anode side of the ion exchange membrane during operation, is supplied with a fuel gas, and the cathode is supplied with a source of oxidant, and wherein the fuel gas is introduced at a first location relative to the ion exchange membrane, and any remaining fuel gas and by-products are removed at a second location, and wherein the size of the variously sized openings has a first size when measured at the first location, and a second size when measured at the second location, and wherein the first size is smaller than the second size.

5. A fuel cell as claimed in claim 1, and wherein the surface area of both current collectors define a variable amount of open area.

6. A fuel cell as claimed in claim 1, wherein the surface area of each current collector defines a plurality of predetermined open areas, and wherein the respective open areas are variable in size and location, and wherein the location of the predetermined open areas and the relative open area percentage in relative comparison to the surface area of the current collector are substantially the same.

7. A fuel cell as claimed in claim 1, and wherein the surface area of each current collector defines a plurality of predetermined open areas, and wherein the respective open areas are variable in size and in location and wherein the location of the open areas and the relative open area percentage in relative comparison to the surface area of the current collectors are different.

8. A fuel cell as claimed in claim 1, wherein the ion exchange membrane has a gas diffusion layer which is borne on at least one of the anode or cathode sides, and wherein the gas diffusion layer has a surface area defined by X, Y, and Z axes, and wherein the hydrophobicity of the gas diffusion layer is varied in one of the X, Y, or Z axes.

9. A fuel cell as claimed in claim 1, wherein the ion exchange membrane has a gas diffusion layer which is borne on at least one of the anode or cathode sides, and wherein the gas diffusion layer has a surface area defined by X, Y, and Z axes, and wherein the hydrophobicity and porosity of the gas diffusion layer is varied in one of the X, Y, or Z axes.

10. A fuel cell as claimed in claim 1, wherein a gas diffusion layer is borne on one of the anode or cathode sides of the ion exchange membrane, and wherein the gas diffusion layer has a surface treatment, which in combination with the current collector, provides for substantially uniform hydration of the ion exchange membrane.

11. A fuel cell as claimed in claim 1, wherein a gas diffusion layer is borne by at least one of the anode or cathode sides of the ion exchange membrane, and wherein the gas diffusion layer has an outwardly facing surface, and wherein a substantially pressure independent contact resistance is established between the outwardly facing surface of the gas diffusion layer and the current collector.

12. A fuel cell as claimed in claim 1, wherein a gas diffusion layer having a porous metalized outwardly facing surface is borne by at least one of the anode or cathode sides of the ion exchange membrane, and wherein a substantially pressure independent contact resistance is established between the porous metalized outwardly facing surface, and the adjacent current collector, and wherein the porosity of the porous metalized outwardly facing surface is substantially uniform.

13. A fuel cell as claimed in claim 1, wherein a gas diffusion layer having a porous metalized outwardly facing surface is borne by at least one of the anode or cathode sides of the ion exchange membrane, and wherein a substantially pressure independent contact resistance is established between the porous metalized outwardly facing surface, and the adjacent current collector, and wherein the porosity is varied such that, in combination with the current collector, the ion exchange membrane is substantially uniformly hydrated.

14. A fuel cell as claimed in claim 1, and wherein a pair of ion exchange membranes are made integral with a hand manipulatable fuel cell module, and wherein the fuel cell module produces heat energy during operation, and has a cathode airflow which dissipates less than a preponderance of the heat energy produced during operation.

15. A fuel cell as claimed in claim 1, and wherein a pair of ion exchange membranes are made integral with a hand manipulatable fuel cell module, and wherein the fuel cell module produces heat energy during operations, and has a cathode airflow which dissipates a preponderance of the heat energy generated during operation.

16. A fuel cell as claimed in claim 1, and wherein a pair of ion exchange membranes are made integral with a hand manipulatable fuel cell module, and wherein the cathode sides of the respective ion exchange membranes are disposed in spaced proximal relation one to the other, and the anode sides of the respective ion exchange membranes are distally related.

17. A fuel cell as claimed in claim 1, wherein a gas diffusion layer is borne by at least one of the anode or cathode sides, and which further has a gas permeability and hydrophobicity which, in combination with the plurality of variously sized opening as defined by the current collectors, facilitates the effective hydration of the ion exchange membrane.

18. A fuel cell as claimed in claim 17, and wherein the gas permeability is controlled, in part, by a porous metalized layer which is borne by the gas diffusion layer.

19. A fuel cell as claimed in claim 18, and wherein the porous metalized layer is substantially uniformly porous.

20. A fuel cell as claimed in claim 18, and wherein the porous metalized layer has a non-uniform porosity.

21. A fuel cell as claimed in claim 18, and wherein a pressure independent contact resistance is established between the porous metalized layer and the adjacent current collector.

22. A fuel cell as claimed in claim 21, wherein the plurality of variously sized openings which are defined by the current collector are uniformly spaced one from another.

23. A fuel cell as claimed in claim 21, and wherein the plurality of variously sized openings which are defined by the current collector are spaced at variable distances one from another.

24. A fuel cell as claimed in claim 21, and wherein the gas diffusion layer has a surface area defined by X, Y, and Z axes, and wherein the hydrophobicity of the gas diffusion layer is varied in at least one of the X, Y, and Z axes.

25. A fuel cell as claimed in claim 21, and wherein a pair of ion exchange membranes are provided and which are made integral with a hand manipulatable fuel cell module which has a cathode airflow, and wherein the fuel cell module produces heat energy during operation and wherein a preponderance of the heat energy is removed by way of the cathode airflow.

26. A fuel cell as claimed in claim 25, and wherein the anode sides of the respective ion exchange membranes are disposed in spaced proximal relation one to the other and the cathode sides of the respective ion exchange membranes are distally related.

27. A fuel cell as claimed in claim 17, and wherein a pair of ion exchange membranes are provided and which are made integral with a hand manipulatable fuel cell module which has a cathode airflow, and wherein the fuel cell module produces heat energy during operation and wherein less than a preponderance of the heat energy is removed by way of the cathode airflow.

* * * * *

UNITED STATES PATENT AND TRADEMARK OFFICE
CERTIFICATE OF CORRECTION

PATENT NO. : 7,056,608 B2 Page 1 of 1
APPLICATION NO. : 10/367985
DATED : June 6, 2006
INVENTOR(S) : Greg A. Lloyd et al.

It is certified that error appears in the above-identified patent and that said Letters Patent is hereby corrected as shown below:

Claim 3: Column 21, line 17, please delete the word "arid".

Signed and Sealed this

Eighth Day of July, 2008

JON W. DUDAS
*Director of the United States Patent and Trademark Office*